(12) United States Patent
Vissenberg

(10) Patent No.: US 11,725,804 B2
(45) Date of Patent: Aug. 15, 2023

(54) MICRO LED SHEET WITH SMALL SPHERES TO ENABLE DIGITAL BEAM SHAPING

(71) Applicant: SIGNIFY HOLDING B.V., Eindhoven (NL)

(72) Inventor: Michel Cornelis Josephus Marie Vissenberg, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 11 days.

(21) Appl. No.: 17/599,984

(22) PCT Filed: Apr. 6, 2020

(86) PCT No.: PCT/EP2020/059736
§ 371 (c)(1),
(2) Date: Sep. 29, 2021

(87) PCT Pub. No.: WO2020/207957
PCT Pub. Date: Oct. 15, 2020

(65) Prior Publication Data
US 2022/0178517 A1 Jun. 9, 2022

(30) Foreign Application Priority Data
Apr. 9, 2019 (EP) .................................... 19168159

(51) Int. Cl.
*F21V 14/04* (2006.01)
*F21V 5/00* (2018.01)
(Continued)

(52) U.S. Cl.
CPC .............. *F21V 14/04* (2013.01); *F21V 5/002* (2013.01); *F21V 5/041* (2013.01); *H05B 47/17* (2020.01); *F21Y 2115/10* (2016.08)

(58) Field of Classification Search
CPC ...... F21Y 2115/10; F21V 5/041; F21V 5/002; F21V 14/04; H05B 47/17
See application file for complete search history.

(56) References Cited

U.S. PATENT DOCUMENTS 9,618,179 B2    4/2017  Michiels et al.
2017/0242161 A1 8/2017  Zhang et al.

FOREIGN PATENT DOCUMENTS

CA      3029487 A       3/2019
CN      106526976 A     3/2017
WO      2017198517 A1   11/2017

*Primary Examiner* — Anabel Ton

(57) ABSTRACT

The invention provides a lighting device (1100) comprising a first 2D arrangement (100) of a plurality n of light sources (10) and a second 2D arrangement (200) of a plurality m of beam shaping elements (20) configured downstream of the light sources (10), wherein: —the light sources (10) are configured to generate light source light (11), wherein the n light sources (10) comprises a plurality k of individually controllable subsets (110) of light sources (10), wherein the beam shaping elements (20) are configured to shape a beam of the light source light (11) of the n light sources (10), and wherein n≥16, m≥4, n/m>1, and 4≤k≤n; —upstream of each beam shaping element (20) light sources (10) are configured of different individually controllable subsets (110), and wherein two or more of the beam shaping elements (20) have different spatial configurations of the light sources (10) that are configured upstream of the respective beam shaping elements (20).

15 Claims, 13 Drawing Sheets

(51) Int. Cl.
*F21V 5/04* (2006.01)
*H05B 47/17* (2020.01)
*F21Y 115/10* (2016.01)

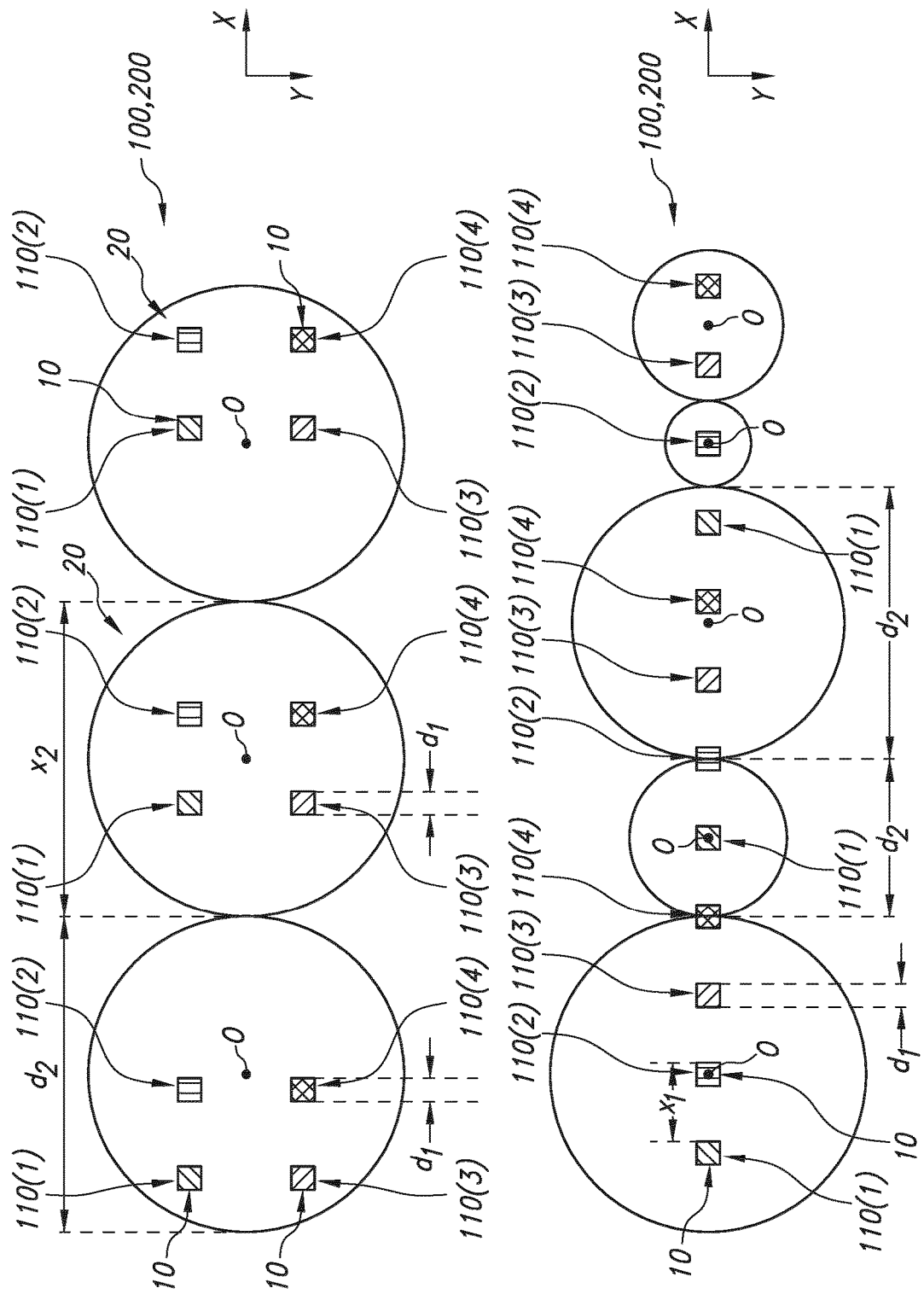

MICRO LED SHEET WITH SMALL SPHERES TO ENABLE DIGITAL BEAM SHAPING

CROSS-REFERENCE TO PRIOR APPLICATIONS

This application is the U.S. National Phase application under 35 U.S.C. § 371 of International Application No. PCT/EP2020/059736, filed on Apr. 6, 2020, which claims the benefit of European Patent Application No. 19168159.2, filed on Apr. 9, 2019. These applications are hereby incorporated by reference herein.

FIELD OF THE INVENTION

The invention relates to a lighting device. The invention further relates to a luminaire or a lighting system comprising such lighting device.

BACKGROUND OF THE INVENTION

Panels with lens arrays are known in the art. US2017/0242161, for instance, describes a display panel comprising a substrate, an array of pixel light sources that produces light, an array of pixel driver circuits that is electrically coupled to the array of pixel light sources, wherein the pixel driver circuits drive corresponding pixel light sources and each pixel light source is individually controllable, and an array of micro lenses aligned to the pixel light sources and positioned to reduce a divergence of light produced by the pixel light sources, wherein the arrays of pixel driver circuits, pixel light sources and micro lenses are all integrated on the substrate. The display panel further comprises an optical spacer that maintains a position of the array of micro lenses relative to the array of pixel light sources, the optical spacer also integrated on the substrate.

U.S. Pat. No. 9,618,179B2 discloses a lighting unit comprising an arrangement of a plurality of light source units configured to provide corresponding light source unit light, a first foil comprising a plurality of transmissive first foil regions, wherein each first foil region comprises a plurality of optical elements, and a second foil comprising a plurality of transmissive second foil regions, wherein each second foil region comprises a plurality of optical elements, wherein each light source unit has a corresponding first foil region configured downstream of said light source unit and a corresponding second foil region configured downstream of said first foil region.

WO2017/198517A1 discloses an optical output device for receiving incident light and providing output light, comprising a plate having a first main surface for receiving the incident light and a second opposing surface for providing the output light, wherein at least one of the first and second surfaces comprises a tessellated surface of tessellated lenses, wherein the tessellated lenses comprise at least first and second regions wherein within each region all hexagons are regular hexagons of the same size and the same angular orientation with respect to each other, wherein the first and second regions have a relative rotation between them, of the lenses about a normal to the tessellated surface, wherein the first and second regions are randomly aligned with respect to each other, and wherein each region comprises at least seven tessellated lenses.

CA3029487A discloses a luminaire including an illumination light source matrix including illumination light sources configured to be driven by electrical power to emit light rays for illumination lighting. The luminaire further includes an optical lens positioned and configured to extend over the illumination light source matrix and including an input surface coupled to receive incoming light rays emitted by the illumination light sources and an output surface. Both the input surface and the output surface each include various portions to refract or total internally reflect the incoming light rays emitted by the illumination light sources passing through to shape or steer the illumination lighting into an outputted beam pattern. A coupled illumination light source driver selectively controls the illumination light sources individually or in combination to adjust the outputted beam pattern from the optical lens.

SUMMARY OF THE INVENTION

Presently, arrays of addressable LEDs are being developed. Such arrays may be dense arrays, especially when based on micro LEDs. Hence, micro LEDs may form the basis of large-area luminous sheets, that may be flexible. These sheets may be all on/off, but the substrate may also contain pixel electrodes, which size may not necessarily link to the micro LED size. Such micro LED arrays may essentially produce diffuse light. Beam shaping may be obtained by adding beam-shaping optics. However, this may only be practical for very small arrays. Beam shaping with larger sheets becomes unpractical (large) or very limited in possibilities. Further, such beam shaping may not allow a controllable directionality of the beam provided by the LED array.

Hence, it is an aspect of the invention to provide an alternative lighting device, which preferably further at least partly obviates one or more of above-described drawbacks. The present invention may have as object to overcome or ameliorate at least one of the disadvantages of the prior art, or to provide a useful alternative.

Amongst others, herein a planar lighting device (which may be flexible), containing a plurality of light sources, e.g. micro LEDs on a substrate, is proposed. The light sources are individually addressable, or addressable in small clusters (or "subsets"). Especially, in embodiments a layer (monolayer) of (spherical) lenses may be added to give each light source (cluster), a specific intensity distribution. The sphere diameter may especially be (a few times) larger than a light source (or light source cluster, such as micro LED cluster) pitch, such that each light source may get a main beam direction (would the spheres be smaller, then each light source may have multiple intensity peaks). The light source arrangement (like a micro LED array) or the sphere arrangement may in embodiments be ordered. However, especially the sphere positions are not correlated to the light source positions. In this way, a relatively large variation in relative light source-to-sphere positions may be obtained in the planar lighting device.

Hence, in an aspect the invention provides a lighting device ("device") comprising a first 2D (two dimensional) arrangement of a plurality n of light sources (such as e.g. micro LEDs); and a second 2D arrangement of a plurality m of beam shaping elements configured downstream of the light sources. Especially, the light sources are configured to generate light source light. In specific embodiments, the n light sources comprise a plurality k of individually controllable subsets of light sources. Further, especially, the beam shaping elements are configured to shape a beam of the light source light of the n light sources.

In specific embodiments n≥16. Further, in specific embodiments m≥4. In yet further specific embodiments, n/m>1. In yet further specific embodiments 4≤k≤n.

The lighting device is especially configured to generate lighting device light, which comprises the light source light of one or more of the light sources.

Therefore, in specific embodiments upstream of one or more beam shaping elements, more especially upstream of a plurality of the beam shaping elements, even more especially upstream of each beam shaping elements, light sources are configured of different individually controllable subsets. Further, especially, in embodiments two or more of the beam shaping elements, have different spatial configurations of the light sources that are configured upstream of the (respective) beam shaping elements.

Therefore, in (other or the same) specific embodiments, the lighting device may comprise p partitions comprising (i) m1 beam shaping elements and (ii) n1 light sources configured upstream of the m1 beam shaping elements, wherein at least part of the total number of n1 light sources are comprised by the plurality k of individually controllable subsets of light sources. Further, in specific embodiments each of the m1 beam shaping elements and the n1 light sources configured upstream thereof have a configuration relative to each other. In specific embodiments, 1≤p≤m. In further specific embodiments. 4≤m1≤m. Yet further, in specific embodiments n1≥16≤n1≤n. Further, especially irrespective of a distance between the second 2D arrangement and the respective light sources the m1 configurations (within the (respective) partition(s)) mutually differ.

Hence, amongst others the invention provides (in an aspect) a lighting device comprising a first 2D arrangement of a plurality n of light sources and a second 2D arrangement of a plurality m of beam shaping elements configured downstream of the light sources, wherein:
the light sources are configured to generate light source light, wherein the n light sources comprise a plurality k of individually controllable subsets of light sources, wherein the beam shaping elements are configured to shape a beam of the light source light of the n light sources, and wherein n≥16, m≥4, n/m>1, and k≤n/2;
upstream of each beam shaping element light sources are configured of different individually controllable subsets, and wherein two or more of the beam shaping elements have different spatial configurations relative to the light sources that are configured upstream of the respective beam shaping elements.

Amongst others, the invention also provides (in an (other) aspect) a lighting device comprising a first 2D arrangement of a plurality n of light sources and a second 2D arrangement of a plurality m of beam shaping elements configured downstream of the light sources, wherein:
the light sources are configured to generate light source light, wherein the n light sources comprise a plurality k of individually controllable subsets of light sources, wherein the beam shaping elements are configured to shape a beam of the light source light of then light sources, and wherein n≥16, m≥4, n/m>1, and 4≤k≤n;
the lighting device comprises p partitions comprising (i) m1 beam shaping elements and (ii) n1 light sources configured upstream of the m1 beam shaping elements, wherein at least part of the total number of n1 light sources are comprised by the plurality k of individually controllable subsets of light sources, wherein each of the m1 beam shaping elements and the n1 light sources configured upstream thereof have a configuration relative to each other, wherein 1≤p≤m, 4≤m1≤m, and 16≤n1≤n, and wherein irrespective of a distance between second 2D arrangement and the respective light sources the m1 configurations mutually differ.

With such device(s), it may be possible to control beam shape and/or beam direction of the lighting device light (which may essentially consist of the light source light of one or more of the light sources). Narrow beams, broad beams, asymmetric beams, etc., may all be provided with the lighting device, dependent upon which light sources (and how they) contribute to the lighting device light. Hence, by controlling the light sources, different luminous intensity distributions may be created.

Relative to a beam shaping element, upstream thereof one or more, more especially two or more, light sources may be configured. Hence, light source light of those light sources may be beam shaped by that beam shaping element, that is configured downstream of those (one or more, more especially two or more) light sources. These (one or more, more especially two or more) light sources are thus configured upstream of that specific beam shaping element. Hence, especially upstream of each beam shaping element, one or more, especially two or more, even more especially four or more, light sources may be configured. In this way, each of the plurality of light sources is configured of a beam shaping element. Hence, all of the n light sources are configured upstream of the m beam shaping elements. When m>1, each of the beam shaping elements are configured downstream of a subset of then light sources. Two or more of the light sources configured upstream of a beam shaping element may be individually controllable. Hence, in embodiments upstream of each of the (m1) beam shaping elements two or more light sources may be configured that may be individually controllable. Hence, in embodiments upstream of each beam shaping element light sources are configured of different individually controllable subsets. Therefore, in embodiments each beam shaping element (such as a lens) may have at least two separately controllable light sources.

Especially, in embodiments the light sources may have a first pitch and the beam shaping elements may have a second pitch, wherein the first pitch is smaller than the second pitch, and especially a ratio of the second pitch to the first pitch is not an integer; especially, the ratio is larger than 2 (see further also below). Alternatively or additionally, the beam shaping elements may have dimensions (in a plane parallel to a plane of the light sources) that are larger than the dimensions of the (respective) light sources. Alternatively or additionally, the beam shaping elements are configured in a random or quasi random arrangement (different from an arrangement of the light sources) and/or the light sources are configured in a random or quasi random arrangement (different from an arrangement the beam shaping elements).

In such embodiments, but also in other embodiments, see also below, the one or more individually controllable light sources or subset of light sources may provide a dimming range of the light source light. Further, in specific embodiments, two or more of the beam shaping elements have different spatial configurations of the light sources that are configured upstream of the respective beam shaping elements. Hence, the light sources may be configured such that two or more beam shaping elements may upstream of these beam shaping elements different configurations of light sources. The different configurations especially relate to the configuration of the light sources in a plane, relative to the arrangement of the beam shaping element(s). The light sources may spatially be arranged differently. When there are different configurations, the beam of light source light downstream of the respective two or more beam shaping elements may differ. Especially, a selection of the light sources upstream of one of the two or more beam shaping elements may lead to a beam downstream of the respective beam shaping element that may essentially not be creatable with the light sources upstream of another of the two or more beam shaping elements. This may amongst others be achieved when e.g. the light sources or the beam shaping elements are configured in an arrangement that is random or quasi random (see also below). Hence, in embodiments there may be at least two different spatial configurations of source beam shaping element combinations.

The person skilled in the art will know when two configurations are spatially different.

When two spatial configurations of light sources relative to two respective beam shaping elements (configured downstream of the respective configurations of light sources) are identical, but one or more are missing in one of the configurations, than this will not be considered spatially different configurations (e.g. both hexagonal packing, but one missing one element).

When the configurations of the light sources are the same, but the optical axes of the beam shaping elements are configured different relative to the respective configurations of the light sources, these are considered spatially different configurations (of light sources and their respective downstream configured beam shaping elements). For instance, assume two pentagonal configurations with each five light source, each pentagon has a center with the light source at equidistances from the centers. When the respective beam shaping elements have optical axes intersecting at the pentagonal planes at different distances from the centers, then both configurations of light sources and respective beam shaping elements are spatially different. For instance, one optical axis may interest with the center and one may not intersect; in the latter variant, the beam shaping element may be offset relative to the configuration of light sources upstream of the respective beam shaping element.

When two configurations of light sources, downstream of two respective beam shaping elements have one or more shortest distances between neighboring light sources that is (are) only available in one of the configurations of light sources, this may be proof of a spatially different configurations of beam shaping elements and their respective upstream configured light sources. Differences in shortest distances may be larger than about 5% of a dimension of the light source (such as a length, width, or diameter of a solid state light source die).

When the one of two configurations cannot be made matching on the other (not due to the absence of one or more elements in e.g. one of the configurations), this may be due to spatially different configurations. For instance, a triangle having two sides a configured under an angle of 90°, may define exactly at the same position three light sources as a square with sides a. Hence, such three light sources configured in such triangular configuration may not be spatially different from such square configuration of four light sources. However, a pentagon with sides may define five light source positions leading to a configuration that is spatially different from a square with sides a with four light source positions.

Hence, in specific embodiments the lighting device may comprise p partitions comprising (i) m1 (adjacent) beam shaping elements and (ii) n1 (adjacent) light sources configured upstream of the m1 beam shaping elements. Especially, each of the m1 beam shaping elements and the n1 light sources configured upstream thereof have a configuration relative to each other. In specific embodiments, $1 \leq p \leq m$. In embodiments, $1 \leq m1 \leq m$. In yet further specific embodiments $4 \leq m1 \leq m$. Yet further, in specific embodiments $n1 \geq 16$, especially $16 \leq n1 \leq n$. More especially, there may be at least some randomness (see also above). Therefore, in specific embodiments, irrespective of a distance between second 2D arrangement and the respective light sources the m1 configurations mutually differ. Hence, in embodiments the lighting device comprises p partitions comprising (i) m1 beam shaping elements and (ii) n1 light sources configured upstream of the m1 beam shaping elements, wherein each of the m1 beam shaping elements and the n1 light sources configured upstream thereof have a configuration relative to each other, wherein $1 \leq p \leq m$, $4 \leq m1 \leq m$, and $n1 \geq 16$, and wherein in specific embodiments—irrespective of a distance between second 2D arrangement and the respective light sources—the m1 configurations mutually differ.

With such device, as function of controlling the light sources, the beam shapes and/or beam directions may be controlled. Further, with such device an essentially Lambertian emission of the lighting device light may be obtained when all light sources are switched on, but very different beam shapes and/or beam directions may be obtained by choosing one or more subset of the total number of light sources to generate lighting device light. From Lambertian, to narrow beam, to batwing shaped light distributions may be obtained with a single lighting device. However, in embodiments also an asymmetric luminous intensity distribution of the lighting device light may be created.

Hence, the invention provides in an aspect lighting device comprising a first 2D arrangement of a plurality n of light sources and a second 2D arrangement of a plurality m of beam shaping elements configured downstream of the light sources. The term "2D arrangement" may refer to a 2D array. As indicated below, the first arrangement and/or the second arrangement are not necessarily regular. In embodiments, one of these, or both, may be random, or even better quasi random, such that the arrangement is (essentially) irregular, but still evenly distributed without large gaps or cluster formation. Hence, in specific embodiments the second 2D arrangement of beam shaping elements is random or quasi random (a random or quasi random arrangement). In other specific embodiments, the first arrangement of light sources is random or quasi random (a random or quasi random arrangement).

Hence, in embodiments at least part of the total number of light sources and/or at least part of the total number of beam shaping elements may be arranged in an irregular arrangement. However, in embodiments also embodiments at least part of the total number of light sources and/or at least part of the total number of beam shaping elements may be arranged in a regular arrangement. Especially, in embodiments at least part of the total number of beam shaping elements may be arranged in an irregular arrangement. This will further be elucidated below.

In specific embodiments, the lighting device is a planar device. In further specific embodiments, the lighting device may be rigid or flexible. For instance, flexible sheets with light sources may be applied. Also flexible sheets with beam shaping elements may be applied. Or the beam shaping elements may be contained between to flexible sheets (see further also below).

Especially, the first 2D arrangement of the light sources may be based on a single (flexible) support with the light sources embedded therein or attached thereto. Therefore, in specific embodiments the first 2D arrangement of light sources may have a length and a width that is substantially larger than a height, such as at least 10 times higher, like at least 100 times higher. Hence, in embodiments the plurality of light sources are comprised by a (flexible) sheet or (flexible) sheet-like layer (such as especially a monolayer). In embodiments, the sheet may be curved.

Especially, the second 2D arrangement may be based on a layer or multi-layer comprising in a single layer the beam shaping elements. In embodiments, the second 2D arrangement may comprise of a first layer and a second layer, between which the beam shaping elements are configured. These layers may be flexible layers. Hence, in specific embodiments the beam shaping elements are configured next to each other, in a single plane (which may be curved in embodiments). Therefore, in specific embodiments, the second 2D arrangement of beam shaping elements may have a length and a width that is substantially larger than a height, such as at least 10 times higher, like at least 100 times higher. Hence, in embodiments the plurality of beam shaping elements are comprised by a sheet or sheet-like layer. In embodiments, the sheet may be curved.

As indicated above, in embodiments the beam shaping elements may be contained between two layers. This may especially be the case when the beam shaping elements comprise spheres. When the beam shaping elements comprise half-domes, a layer with integrated half-domes may be provided. In alternative embodiments, the beam shaping elements may be embedded in a host material, especially a light transparent material, such as a silicone layer. Especially, the index of refraction at e.g. 550 nm for the host material is substantially lower, such as at least 10% lower, or especially at least 25% lower than the refractive index of the beam shaping elements.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Optionally, downstream of the beam shaping elements there may be further optics, like e.g. an optical filter like a color filter or a polarizing filter, or a diffuser with limited scattering angle, a UV blocking filter, etc. . . . . In general, however, the optics downstream of the beam shaping elements are essentially not strongly diffusive, in order to maintain the beam shapes. These optional further optics are herein further not discussed.

Especially, the light sources are configured to generate light source light. The lighting device is especially configured to generate lighting device light. The lighting device light may comprise the light source light of the light sources which are switched on (in a controlling mode; see below).

Especially, the lighting device is configured to generate visible light, though other options may also be possible, like additionally or alternatively one or more of IR and UV radiation.

In embodiments, the lighting device may be configured to generate white (lighting device) light. In other embodiments, the lighting system may be configured to generate colored (lighting device) light. As the lighting device light may be controllable (see also below), in specific embodiments the lighting device light may have controllable optical properties selected from the group of color point, color temperature, color rendering index, etc.

As further elucidated below, especially (at least) the lighting device light is controllable in respect to the intensity distribution. Hence, beam angles and or beam widths, and or intensity distributions within a beam (of the lighting device light) may herein be controllable. As indicated above, the beam shaping elements are configured to shape a beam of the light source light of then light sources.

The terms "visible", "visible light" or "visible emission" and similar terms refer to light having one or more wavelengths in the range of about 380-780 nm.

The term "white light" herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The phrases "different light sources" or "a plurality of different light sources", and similar phrases, may in embodiments refer to a plurality of solid state light sources selected from at least two different bins. Likewise, the phrases "identical light sources" or "a plurality of same light sources", and similar phrases, may in embodiments refer to a plurality of solid state light sources selected from the same bin.

Herein, the term "light source" especially refers to a solid state light source, especially a small solid state light source, such as having a mini size or micro size. For instance, the light sources may comprise one or more of mini LEDs and micro LEDs. Especially, in embodiment the light sources comprise micro LEDs or "microLEDs" or "µLEDs". Herein, the term mini size or mini LED especially indicates to solid state light sources having dimensions, such as die dimension, especially length and width, selected from the range of 100 µm-1 mm. Herein, the term µ size or micro LED especially indicates to solid state light sources having dimensions, such as die dimension, especially length and width, selected from the range of 100 µm and smaller.

The lighting device comprises n light sources. Especially, $n \geq 16$, even more especially $n \geq 64$, yet even more especially $n \geq 100$. In yet further embodiments, $n \geq 4096$, such as $n \geq 10,000$, though $n \geq 100,000$ may also be possible. The term "lighting device" may also refer to a plurality of functionally coupled lighting devices. Hence, the term "lighting system"

(see further also below) may refer to a plurality of functionally coupled lighting devices, each e.g. having 4096 solid state light sources.

As indicated above, the lighting device light may be controllable, especially in the sense that at least the intensity distribution of the lighting device light may be controllable. Hence, in embodiments the angular intensity distribution may be controllable. Therefore, in specific embodiments the n light sources may comprise a plurality k of individually controllable subsets of light sources. In embodiments, k=n. When each subset would comprise a single light source, k=n. Especially, k≥2, such as more especially k≥4. In general, there will be substantially more subset individually controllable, such as k≥16. In specific embodiments, k≤n/2, or even k≤n/4, though k may also be n. Especially, in embodiments 4≤k≤n.

The term "individually controllable" may especially indicate that the individually controllable light source or subset of light sources may be switched from an off-state to an on-state (or vice versa) and/or may be dimmed in intensity. The latter may e.g. refer to a stepwise or stepless up dimming (increasing intensity) or down dimming (decreasing intensity). In such embodiments, the one or more individually controllable light sources or subset of light sources may provide a dimming range of the light source light. Hence, in embodiments the beam shape (and luminous intensity) of the lighting device light may be controlled by switching on (and/or others off) one or more controllable subsets of light sources. In other embodiments the beam shape (and luminous intensity) of the lighting device light may be controlled by up dimming (and/or down dimming others) one or more controllable subsets of light sources. In yet other embodiments, both options may be applied (on different controllable subsets).

Hence, in embodiments the lighting device light is thus also controllable in intensity. As indicated above, in specific embodiments the lighting device light is thus also controllable in one or more of color point, color temperature, color rendering, etc.

As indicated above, the m beam shaping elements are especially configured to shape a beam of the light source light of the n light sources. In general, see also below, a single beam shaping element may be configured downstream of more than one light source. Hence, especially n/m>1, even more especially n/m≥4, like n/m≥10. In embodiments, n/m≥100. In embodiments, n/m≥500. In specific embodiments, n/m≤20,000, though larger may also be possible. In further specific embodiments, n/m≤10,000.

The beam shaping elements may comprise one or more of collimators and lenses. The collimators may especially be solid light transparent bodies. The lenses are light transparent bodies per se. Hence, the beam shaping elements may essentially consist of light transparent material. Hence, the beam shaping elements may especially be refractive elements (refractive for the light source light) or total internal reflective elements.

The light transparent material may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transparent material may comprise an aromatic polyester, or a copolymer thereof, such as e.g. polycarbonate (PC), poly(methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transparent material may comprise polyethylene terephthalate (PET). Hence, the light transparent material is especially a polymeric light transmissive material. However, in another embodiment the light transparent material may comprise an inorganic material. Especially, the inorganic light t transparent material may be selected from the group consisting of glasses, (fused) quartz, transmissive ceramic materials, and silicones. Also, hybrid materials, comprising both inorganic and organic parts may be applied. Especially, the light transparent material comprises one or more of PMMA, transparent PC, or glass.

In embodiments, the beam shaping elements may comprise a collimator part and a lens part, integrated in a single body. Hence, a single beam shaping element may in embodiments both have a collimation and lens functionality. The lenses are especially converging lenses. In specific embodiments, all beam shaping elements comprise lenses, even more especially essentially the same lenses.

In specific embodiments, m≥4. Even more especially, m≥64, such as m≥100 or m≥10000. In yet another specific embodiment, m=1. Especially, however, m≥4.

The lighting device may be divided in (virtual) segments or partitions. These may be cross-sectional parts including a subset of the total number of the beam shaping elements and the light sources that are configured upstream of these beam shaping elements of the subset of the total number of the beam shaping element. Such segments or partitions may build up the lighting device, but they are not necessarily identical unit cells (though this may be the case), in view of the possible embodiments wherein irregular arrangements of light sources and/or beam shaping elements are used. However, a single specific partition may comprise an irregular arrangement of light sources and/or beam shaping elements, but a plurality of such specific partitions may be configured in a regular arrangement. This may in embodiments lead to a quasi-random arrangement of the light sources and/or beam shaping elements. Repeating units of random cells is a way to create a quasi-random arrangement. Another one way is to divide the area in regular cells with one source (or lens) per cell, but allow for a random position of this source (or lens) inside the cell. The cell is then a boundary on the randomness of the source position.

Hence, the partitions are especially virtual cross-sectional parts over the entire column of light sources and beam shaping elements. The concept of partitions is herein especially introduced to further explain desirable randomness; see further below.

Each partition comprises a plurality of beam shaping elements and respective light sources. Especially, a partition may relate to a plurality of adjacent beam shaping elements and thus also to a plurality of adjacent light sources. In specific embodiments, two or more of the beam shaping elements of the partition are not adjacent. Hence, the subsets of respective light sources for the respective beam shaping elements may then also not be configured adjacent. Herein, further especially the former ("adjacent") embodiments are further discussed; i.e. the invention is further especially discussed in relation to adjacent beam shaping elements (and light sources), though this is not necessarily the case for the concept of the partitions.

The term "respective light source" and similar terms, especially refers to the light source configured upstream of a specific beam shaping element. Especially, it refers to a light source of which the optical axis (of the light source light of that light source) is configured through the beam shaping element. Hence, in such embodiments more light source light will propagate through the (respective) beam shaping element than through any other (adjacent) beam element.

Each beam shaping element and respective light sources have a specific configuration. Especially, it is referred to the configuration irrespective of the distance of the light sources to the beam shaping elements. This distance is especially determined perpendicular to the respective light source ("z-direction"). Hence, the configuration may also be super position of the light sources and the beam shaping element in(to) a plane, essentially parallel to plane of the respective beam shaping element and to the plane of the respective light sources.

For the sake of definition, it is defined that (in embodiments) each partition includes at least four beam shaping elements. As indicated above, in principle there may be a single partition with all beam shaping elements, but especially there will be a plurality of partitions which together include all beam shaping elements.

Hence, in specific embodiments the lighting device comprises p partitions comprising (i) m1 (adjacent) beam shaping elements and (ii) n1 (adjacent) light sources configured upstream of the m1 beam shaping elements, wherein each of the m1 beam shaping elements and the n1 light sources configured upstream thereof have a configuration relative to each other. Especially, in embodiments $1 \leq p \leq m$. Further, in specific embodiments $4 \leq m1 \leq m$. Yet further in embodiments, $n1 \geq 16$. Yet further in embodiments, $m1 \geq 16$ (and especially $n1 \geq 64$).

Referring to the (total) arrangement of light sources and beam shaping elements, every position below the beam shaping element may correspond with a unique direction of the intensity peak. Would the area be completely filled with individually addressable light sources, all directions can be addressed with the accuracy that may be limited by the source size and optics size. In such a case, one configuration (dense packing) might in principle be sufficient. However, the lighting device may work better if there are more different configurations (for instance at least two: the same dense packing, but shifted by half a pitch will allow for a finer adjustability of the beam, even though all directions are addressable by the first configuration already). Would the area upstream of a beam shaping element not completely be filled with light sources, there may be gaps in the intensity distribution, linked to positions where no source is available. To avoid this, it is desirable that there are at least 1/f different configurations, where f=(total source area)/(total area) is the source area fraction or filling fraction. As indicated above, the addressability of the intensity distribution will be finer with more configurations. Hence, there may be at least 1/f spatially different configurations (of light sources relative to their downstream configured beam shaping elements), especially at least 2/f configurations, or even more especially at least 4/f configurations.

Especially, one or more, even more especially in embodiments a majority, of the (total number of) light sources within the partition belong to different individually controllable subsets. Especially, for each beam shaping element in the partition, at least one respective light source, more especially at least two respective light sources, even more especially at least four respective light sources, belong to different individually controllable subsets. Therefore, in embodiments at least part of the total number of n1 light sources are comprised by the plurality k of individually controllable subsets of light sources. More especially, in embodiments for each beam shaping element within the partition one or more light sources configured upstream of the beam shaping element belong to one or more of the individually controllable subsets. Hence, in embodiments for each beam shaping element within the partition there are one or more light sources, especially two or more light sources, such as at least four, configured upstream of the beam shaping element, which belong to one or more of the individually controllable subsets.

In embodiments of regular arrangements of the beam shaping elements and regular arrangements of the light sources, all configurations might be essentially identical (see however also below). Herein, however especially embodiments are provided wherein a kind of short scale or long scale irregularity may be available (see also above), which may lead to the fact that different configuration may mutually differ. For instance, the at least four different configurations related to the respective at least four beam shaping elements may mutually differ.

Hence, in embodiments irrespective of a distance between second 2D arrangement and the respective light sources the m1 configurations may mutually differ.

Note that in specific embodiments the partition may comprise also configurations that are essentially the same. Further, there may also be partitions where the configurations do not mutually differ. However, in specific embodiments there may be a plurality of configurations that mutually differ, such as at least four, like at least 16 different types of configurations.

Different configurations with light sources that are individually controllable may allow beam shaping and/or controlling beam direction(s) of the lighting device light generated by the lighting device (from the light source light).

As indicated above, in order to obtain different configurations one or more option may be chosen. In embodiments, the n1 light sources are comprised by a first arrangement of at least part of the total number of n light sources, wherein the first arrangement is random or quasi random. Alternatively or additionally, the m1 beam shaping elements are comprised by a second arrangement of at least part of the total number of m beam shaping elements, wherein the second arrangement is random or quasi random. Yet further, alternatively or additionally, the lighting device may comprise a plurality of spacers, wherein the spacers define the position of at least part of the total number of m beam shaping elements, wherein the spacers are comprised by a third arrangement, wherein the third arrangement is random or quasi random. The spacers may dictate the positions of at least part of the total number of beam shaping elements. Note that when both the light sources and the beam shaping elements may be arranged in a random or pseudorandom arrangement, respectively, the arrangements are not identical.

By introducing (some) randomness, the effect of the invention may be obtained. However, in embodiments of regular arrangements of the beam shaping elements and regular arrangements of the light sources, a subset of all configurations may also mutually differ. This may especially be the case when the pitches do not match. In specific embodiments, the light sources may have a first pitch (x1)

and the beam shaping elements may have a second pitch (x1), wherein the first pitch (x1) is smaller than the second pitch (x2), and wherein a ratio of the second pitch (x2) to the first pitch (x1) is not an integer.

Especially, in embodiments also a two or three times, or even more, such as four times, the ratio does not provide an integer. Hence, in specific embodiments the light sources have a first pitch (x1) and the beam shaping elements have a second pitch (x2), wherein the first pitch (x1) is smaller than the second pitch (x2), and wherein a ratio of the second pitch (x2) to the first pitch (x1) defined as a*x2/x1 is not an integer, wherein a is an integer selected from the range of 1-10. The higher a, the more different configurations may be created.

The term "first pitch" may also refer to a pitch of a subset of light sources. For instance, a regular arrangement of a subset of light sources may have a pitch that differs from the pitch of the beam shaping elements, such that over an array of regular arrangements of the subsets of light source, several times, such as at least four, the beam shaping element and the respective light sources (of the respective regular arrangement of light sources) have mutually different configurations. The term "first pitch" may also refer to first pitches. In the xy plane, the (first) pitch may differ in one or two directions. Note that within partitions the pitches may have a mismatch but the subsets of (all) light sources belonging to the respective partitions and/or the subsets of (all) beam shaping elements belonging to the respective partitions may have regular pitches, as the partitions may be configured in a regular arrangement (when there are a plurality of partitions).

Other embodiments to create different configurations may also be possible.

Hence, even though the beam shaping elements may collimate the light source light of the light sources, when all light sources are switched on a substantially Lambertian light distribution of the lighting device light may be obtained, whereas when one or more subsets of light sources are switched on (but not all light sources are switched on), an intensity distribution deviating, even substantially deviating, from Lambertian may be obtained.

As indicated above, upstream of a beam shaping element a plurality of light sources may be configured, which primarily provide their light source light to the beam shaping element. For instance, all light sources having an optical axis coinciding with parts of the same beam shaping element may be considered respective light sources to the beam shaping element. Hence, in general the in plane dimensions of the beam shaping elements are larger, if not substantially larger, than the in plane dimensions of the light sources. Therefore, the light sources comprise (solid state) light sources having first dimensions d1 selected from the group of a first length, a first width, a first diagonal length, and a first diameter, wherein the beam shaping elements comprise light transmissive elements having second dimensions d2 selected from the group of a second length, a second width, a second diagonal length, and a second diameter, wherein in specific embodiments d2≥4*d1. Especially, the dimensions thus refer to the dimension parallel to the plane of the light sources or beam shaping elements, respectively. The dimension of the light source may be the dimensions of a die in embodiments of a solid state light source.

For instance, in specific embodiments the first dimensions d1 may be at maximum 200 μm, and the second dimensions d2 are at least 800 μm. In specific embodiments, the dimensions d2 may be diameters (herein also indicated as "second diameters"). Other dimensions, however, may also be used.

An embodiment to obtain different configuration is e.g. to use beam shaping elements that have different (in plane) dimensions. Hence, when configured in a 2D arrangement, they may relatively easily adopt or be forced in a random or quasi random arrangement, especially in a random arrangement. Hence, in specific embodiments the beam shaping elements comprise a plurality p2 of subsets of beam shaping elements wherein the subsets mutually differ with respect to at least one of the second dimensions d2, wherein p2≥2. In further specific embodiments, p2≥4, for instance, 2≤p2≤16, though larger number of p2 may also be possible. In specific embodiments, the smallest dimension is 90% or less, like 80% or less of the largest dimension. When assessing dimensions, the same type of dimensions may be assessed, like either width, or length, or diameter, etc.

In specific embodiments, the beam shaping elements comprise half-domes.

The beam shaping elements may have optical axes. Especially, the beam shaping elements may have a one or more especially at least two, symmetry planes which intersect each other at the optical axis, such as which may be the case with a sphere or half dome. The optical axes of the beam shaping elements may especially be configured essentially perpendicular to the first arrangement and perpendicular to the second arrangement.

Alternatively or additionally, the beam shaping elements comprise spheres. When using spheres, it may be relatively easy to use spheres with two or more different dimensions (see also above). Spheres may be very convenient because they may be easy to make in large numbers, especially if the lenses are very tiny. Further, they do not need to be oriented. They are close to focus when in contact with the source (no spacer needed), and they work equally well in all directions (normal simple lenses tend to give huge aberrations in off-axis directions).

In specific embodiments, the lighting device comprises a monolayer of the beam shaping elements.

Further, in specific embodiments n≥100, n/m≥4, k≥10, and p≥10.

The lighting device may be part of or may be applied in e.g. office lighting systems, household application systems, shop lighting systems, home lighting systems, accent lighting systems, spot lighting systems, theater lighting systems, fiber-optics application systems, projection systems, warning sign systems, medical lighting application systems, indicator sign systems, decorative lighting systems, portable systems, automotive applications, (outdoor) road lighting systems, urban lighting systems, green house lighting systems, horticulture lighting, etc.

In yet a further aspect, the invention also provides a luminaire comprising the lighting device as defined herein. The luminaire may further comprise a housing, optical elements, louvres, etc. etc.

In yet a further aspect, the invention also provides a lighting system comprising the lighting device as defined herein, and optionally a control system. Especially, the control system is configured to control the plurality k of individually controllable subsets of light sources. Alternatively, or additionally, the control system may (thus) be configured to control the beam shape and/or beam direction of the lighting device light. Further, optionally the control system may be configured to control the spectral distribution of the lighting device light. Hence, especially the invention provides a lighting system comprising the lighting device as defined herein and a control system, configured to control the plurality k of individually controllable subsets of light sources (and/or configured to control the lighting device light).

The term "controlling", and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. . . . . Beyond that, the term "controlling", and similar terms may additionally include monitoring. Hence, the term "controlling", and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. . . . . The device is thus not necessarily coupled to the lighting system but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Wi-Fi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

When (quasi) randomly arranging the beam shaping elements, beforehand the way how to control the light sources to obtain the desired light distributions may not be known. Hence, a calibration routine may be applied. This may be done in a production plant (of the lighting device or luminaire or lighting system), this may be done on location (by an installer), or this may be done by the consumer (on location). Combinations of such options may also be applied, like a pre calibration in the production plant, and a fine tune calibration on location (after installation). The calibration may also be relatively simply, in that not all possible intensity distributions are assessed ("full calibration"), but the user or installer e.g. defines a few desired positions where lighting device light should be obtained, positions sensors at those location (at the same time or consecutively) (or even uses the eyes), and the calibration routine may defined which light sources belong to the desired intensity distributions.

Hence, in embodiments the control system may be configured to execute in a calibration mode a calibrate routine wherein the calibration routine determines as function of (i) the plurality k of individually controllable subsets of light sources and (ii) one or more of user input information (e.g. based on visual inspection) and a calibration sensor signal a set of (a) intensity distribution characteristics and (b) related light source settings of the plurality k of individually controllable subsets of light sources. The set may e.g. be stored in a memory of the control system. The intensity distribution characteristics may e.g. be an intensity distribution, or a simplified description in terms of peak direction, per subset of light sources. For instance, this can in embodiments be based on a full gonio measurement, but it can alternatively (or additionally) in embodiments also be based on a measurement with a simplified setup with only one or a few lux meters at specific positions to determine the contribution of the subset of sources to a specific light direction (or few directions), like towards a wall or a table, etc.

When a sensor is applied, such sensor may be comprised by the lighting system, but may especially be configured external of the lighting device. In specific embodiments, the lighting system may (thus) further comprise one or more optical sensors, especially external of the lighting device, and functionally coupled to the control system, wherein the one or more optical sensors are configured to generate the calibration sensor signal during the calibrate routine.

Yet further, the lighting system may comprise a user interface, wherein the user interface is functionally connected or connectable to the control system. Alternatively or additionally, the user interface may be provided by an App. Hence, the invention also provides in an aspect a computer program product, which, when running on a computer which is functionally coupled to or comprised by the lighting device or lighting system, as defined herein, is capable of bringing about one or more of the (a) calibration routine, and (b) a method for controlling the plurality of light sources.

In specific embodiments, the control system may include a memory, a processing device (or "processor" or "processor system" or "controller" or "control system"), and a user interface, and optionally a display.

Examples of user interface devices include a manually actuated button, a display, a touch screen, a keypad, a voice activated input device, an audio output, an indicator (e.g., lights), a switch, a knob, a modem, and a networking card, among others. Especially, the user interface device may be configured to allow a user to instruct the device or apparatus with which the user interface is functionally coupled by with the user interface is functionally comprised. The user interface may especially include a manually actuated button, a touch screen, a keypad, a voice activated input device, a switch, a knob, etc., and/or optionally a modem, and a networking card, etc. The user interface may comprise a graphical user interface. The term "user interface" may also refer to a remote user interface, such as a remote control. A remote control may be a separate dedicate device. However, a remote control may also be a device with an App configured to (at least) control the system or device or apparatus.

The controller/processor and the memory may be any type. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit.

In an aspect, the invention also provides a lighting system comprising a lighting device and a control system. The lighting device comprises a first 2D arrangement of a plurality n of light sources and a second 2D arrangement of m of beam shaping elements configured downstream of the light sources, wherein the light sources are configured to generate light source light, wherein then light sources comprises a plurality k of individually controllable subsets of light sources, wherein the one or more beam shaping elements are configured to shape a beam of the light source light of then light sources, and wherein n≥16, 1≤m≤4, n/m≥1, especially n/m≥100, such as n/m≥1000, such as even up to about 200,000, and 2≤k≤n, especially 4≤k≤n, such as 8≤k≤n. The control system is especially configured to control the plurality k of individually controllable subsets of light sources.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a-1f schematically depict some embodiments,

The schematic drawings are not necessarily to scale.

DETAILED DESCRIPTION OF THE EMBODIMENTS

Below, the invention is further elucidated. The term "microLED" may in embodiments refer to a microLED but may also be used as example of a light source, and may thus in other embodiments also refer to e.g. a miniLED.

Figure 1A:
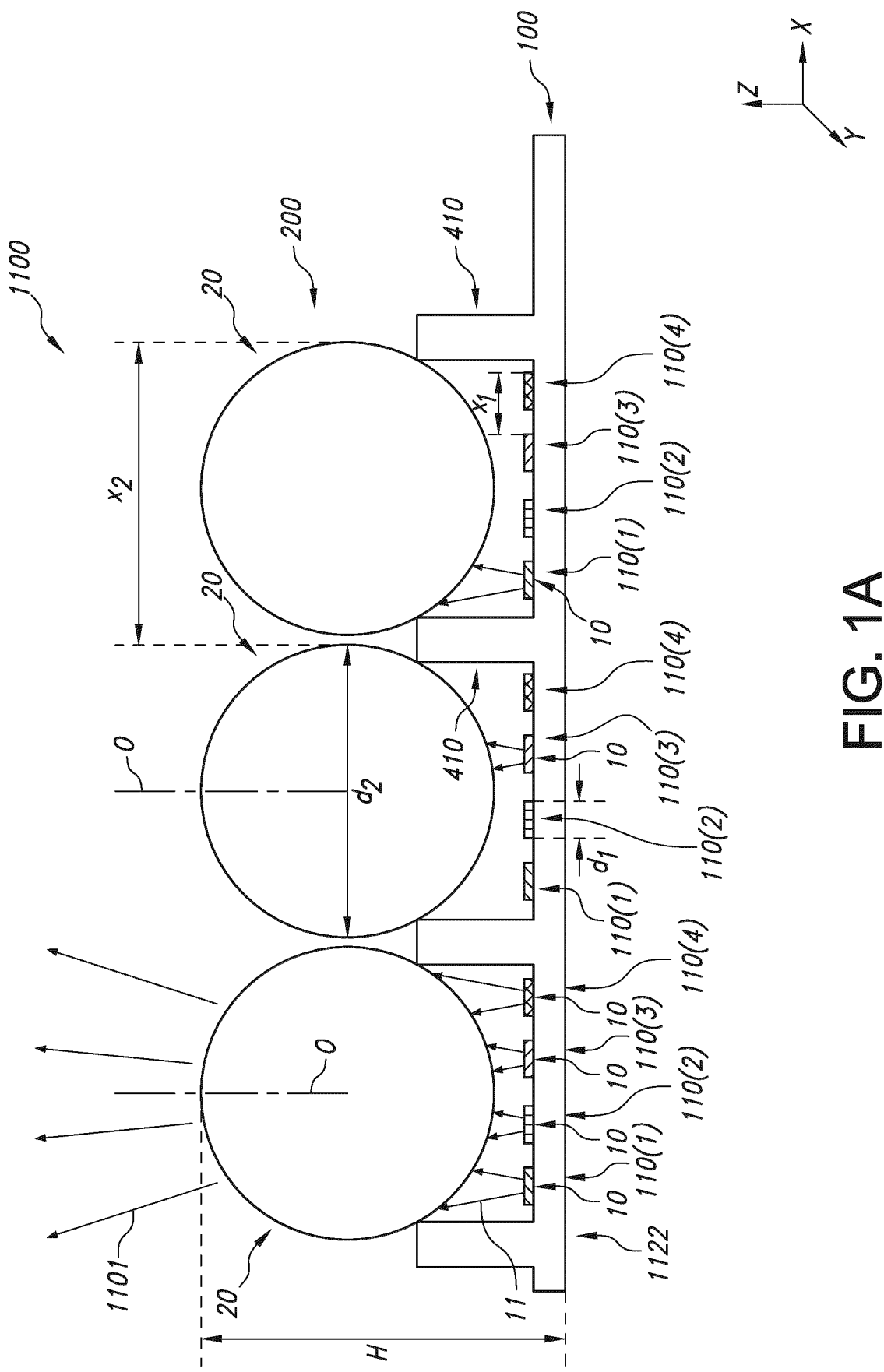

FIG. 1a schematically depicts an embodiment, a regular array of spheres which is placed on a regular array of microLEDs.

FIG. 1a schematically depicts an embodiments of a lighting device 1100 comprising a first 2D arrangement 100 of a plurality n of light sources 10; and a second 2D arrangement 200 of a plurality m of beam shaping elements 20 configured downstream of the light sources 10. The light sources 10 are configured to generate light source light 11. The beam shaping elements 20 are configured to shape a beam of the light source light 11 of the n light sources 10. Here, in this (and other) schematically depicted embodiment(s) the beam shaping elements 20 comprise spheres. However, in other embodiments, alternatively or additionally, the beam shaping elements 20 comprise half-domes. The beam shaping elements 20 have optical axes 0.

Reference x1 indicates a pitch of the light sources 10. reference x2 indicates a pitch of the beam shaping elements 20. Reference H indicates the height of the lighting device, which for the sake of the invention may essentially consist of a substrate 1122, the light sources 10, the beam shaping elements 20, and optionally a second layer (of essentially light transparent material; see FIG. 1d). the substrate 1122 may be flexible.

One or more, or even each of the light sources 10 may be individually controllable. Hence, FIG. 1a also schematically depicts an embodiment wherein the n light sources (10) comprises a plurality k of individually controllable subsets (110) of light sources (10). In embodiments, k=n; then all light sources are individually controllable.

In FIGS. 1a-1f by way of example k=4, i.e. four different individually controllable subsets 110 of light sources 10 are depicted. Hence, all light sources 10 indicated with reference 110(k) belong to the $k^{th}$ subset. Of course, there may be less or more subsets.

In embodiments, all light sources belong to a controllable subset.

Reference 410 refers to spacer elements, which may be used to position the beam shaping elements. Hence, in embodiments the lighting device 1100 may comprise a plurality of spacers 410, wherein the spacers may define the position of at least part of the total number of (m) beam shaping elements 20.

The light sources 10 may comprise solid state light sources. The light sources, such as solid state dies, may have first dimensions d1 selected from the group of a first length, a first width, a first diagonal length, and a first diameter. The beam shaping elements 20 comprise light transmissive elements which may have second dimensions d2 selected from the group of a second length, a second width, a second diagonal length, and a second diameter. Especially, as also schematically depicted d2≥4*d1. For instance, the first dimensions d1 are at maximum 200 μm, and w the second dimensions d2 are at least 800 μm. Here, in some of the schematically depicted embodiments d1 may be the length or width of the light source, especially the solid state light source die. Further, especially in some embodiments schematically depicted herein the dimensions d2 are diameters.

An advantage of this embodiment may be relatively easy calibration: each microLED has a predetermined intensity distribution, because all relative positions may essentially be known. Another advantage of this embodiment is that the spacers block light to neighboring spheres, which would cause satellite peaks in the intensity distribution.

In another embodiment, both microLED array and sphere array may be regular, but the pitch of the sphere array may be different from an integer number of microLED pitches. As a result, each sphere will be associated with a set microLED with positions (with respect to the sphere) that are slightly different from the neighboring spheres. As a result, the set of microLED intensities will have more variation, and the target intensity may be approximated in more detail.

In FIG. 1a, the configuration of the light sources 10 for the respective three beam shaping elements 20 is essentially the same. Hence, here two or more of the beam shaping elements 20 do not have different spatial configurations of the light sources 10 that are configured upstream of the respective beam shaping elements 20.

Figure 1B:
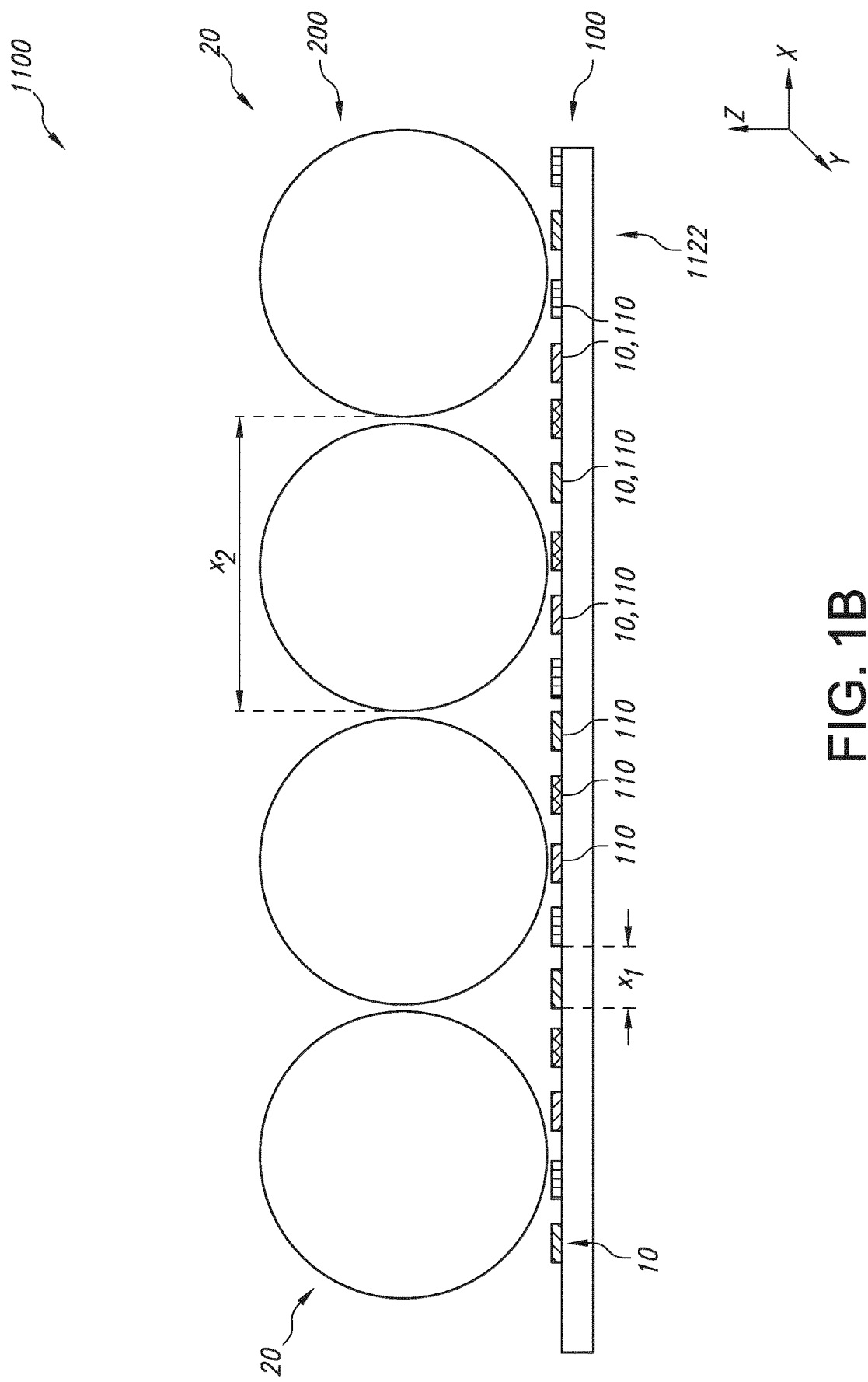

FIG. 1b schematically depicts (such) an embodiment. Here, the pitch of the light sources 10, indicated with x1, and the pitch of the beam shaping elements 20, indicated with x2, are different. The latter may not be an in integer number times the former.

In FIG. 1b, two or more of the beam shaping elements 20, here all four, have different spatial configurations of the light sources 10 that are configured upstream of the respective beam shaping elements 20.

Note that in FIG. 1b, or in other Figures, not all elements, like light sources 10, beam shaping elements 20, controllable subsets 110, etc., are indicated for each light source, beam shaping element, light source/sets of light sources, etc., respectively, are indicated. For readability purposes, only a few of those elements are indicated with their reference numbers.

There may be various alternatives to achieve essentially the same benefit: irregular microLED patterns, irregular sphere arrays caused by variations in sphere diameter, irregular sphere arrays caused by irregular spacer positions, or combinations, etc.

Figure 1C:
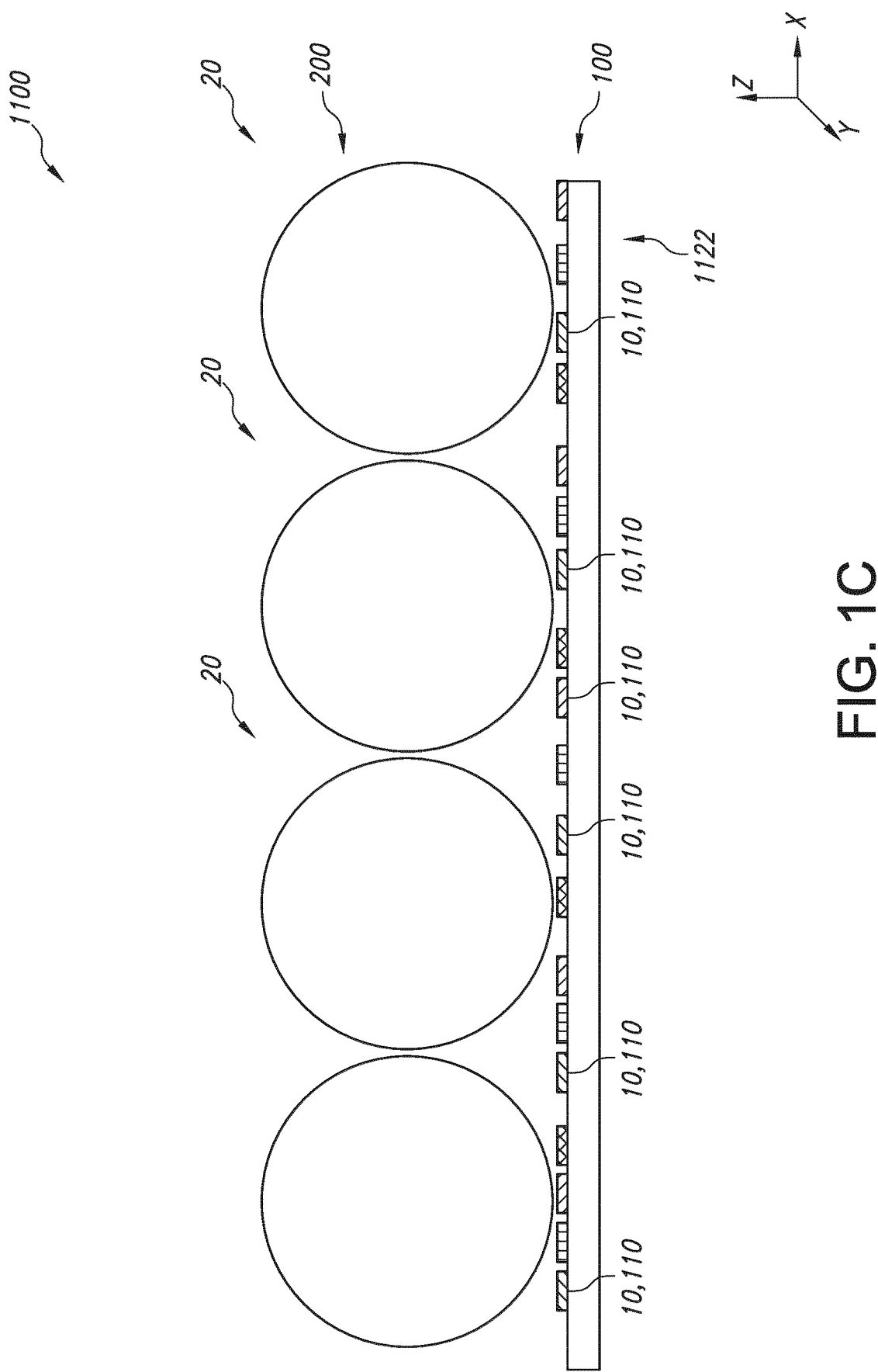

FIG. 1c schematically depicts an embodiment wherein the (n1) light sources are comprised by a first arrangement of at least part of the total number of (n) light sources 10, wherein the first arrangement is random or quasi random.

In FIG. 1c, two or more of the beam shaping elements 20, here all four, have different spatial configurations of the light sources 10 that are configured upstream of the respective beam shaping elements 20.

Figure 1D:
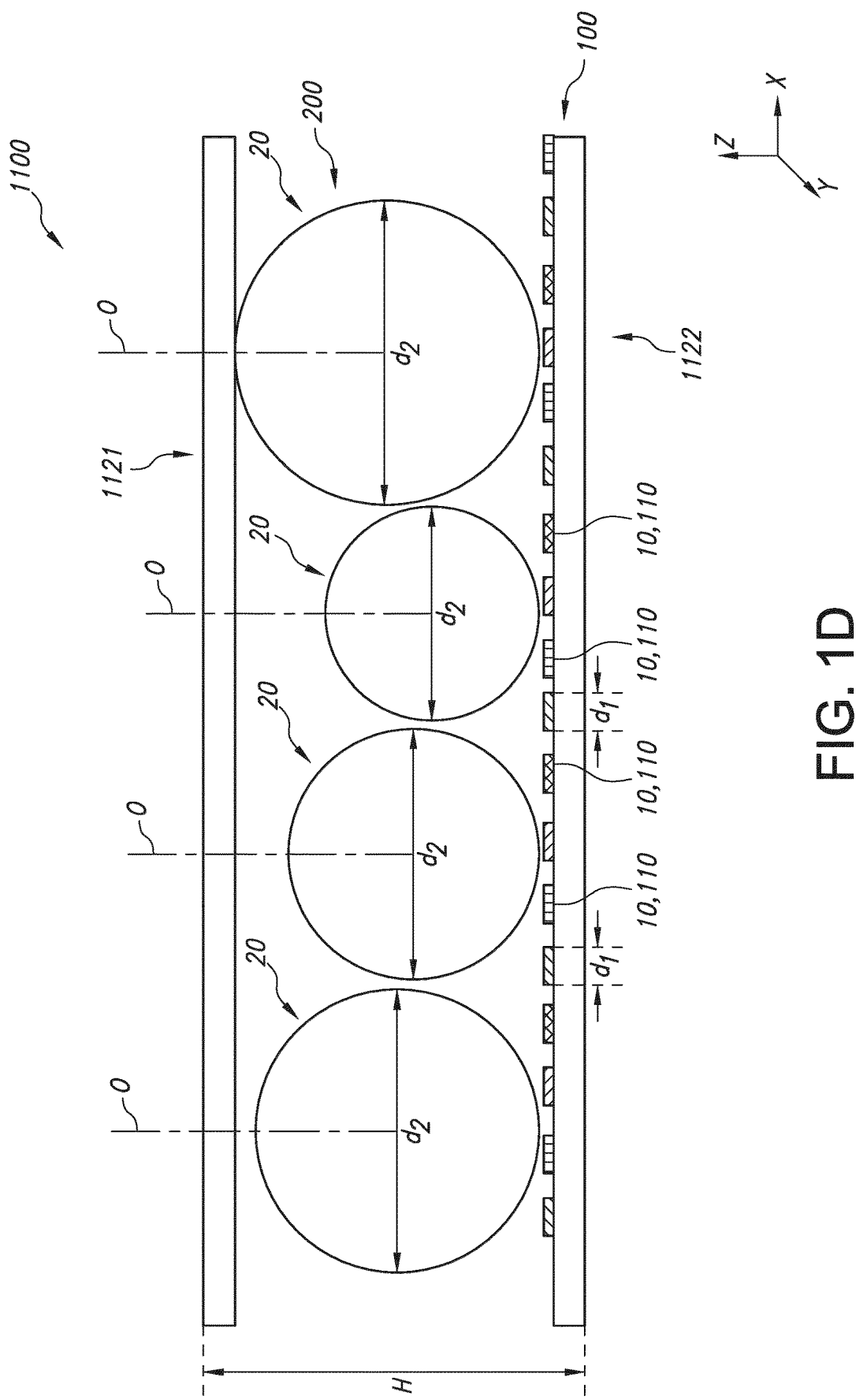

FIG. 1d schematically depicts an embodiment wherein the (m1) beam shaping elements 20 are comprised by a second arrangement of at least part of the total number of (m) beam shaping elements 20, wherein the second arrangement is random or quasi random.

FIG. 1d also schematically depicts an embodiment wherein the wherein the beam shaping elements 20 comprise a plurality p2 of subsets of beam shaping elements 20 wherein the subsets mutually differ with respect to at least one of the second dimensions d2, wherein p2≥2. In this schematic drawing, the most left and most right beam shaping element have the same second dimension (here diameter), whereas the second diameter of the two beam shaping elements 20 in between differ from the two outer beam shaping elements and mutually differ. Hence, in this schematically depicted embodiment p2=3.

Hence, also in FIG. 1d, two or more of the beam shaping elements 20, here all four, have different spatial configurations of the light sources 10 that are configured upstream of the respective beam shaping elements 20.

Here, a second layer 1121 (of essentially light transparent material) is schematically depicted. Such layer may also be available in other embodiments herein described and/or schematically depicted.

Figure 1E:
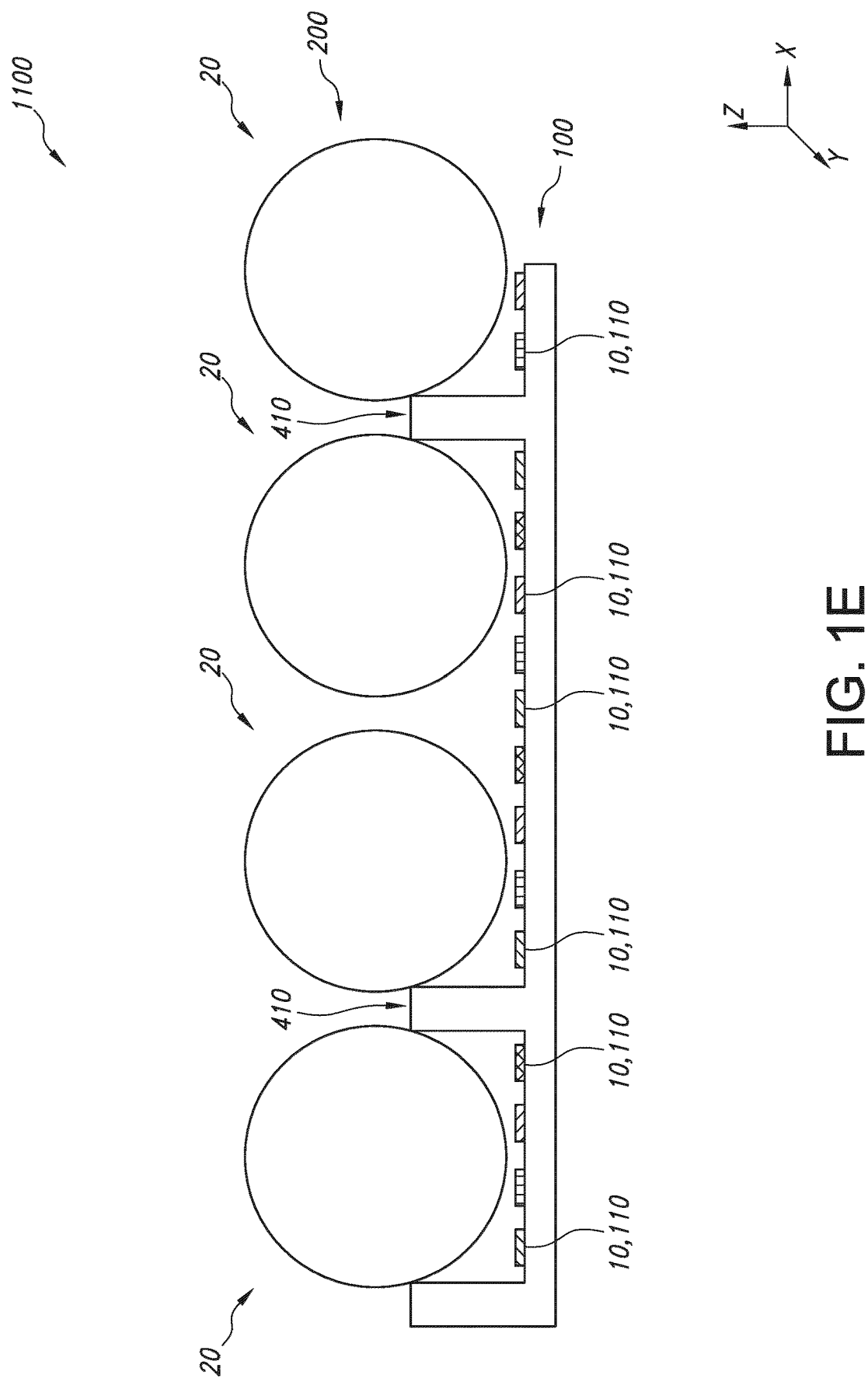

FIG. 1e schematically depicts an embodiment wherein the spacers 410 are comprised by a third arrangement, wherein the third arrangement is random or quasi random.

In FIG. 1b, two or more of the beam shaping elements 20, have different spatial configurations of the light sources 10 that are configured upstream of the respective beam shaping elements 20. Some of them may also have the same different spatial configurations of the light sources 10 that are configured upstream of the respective beam shaping elements 20 (most left, second from left, and most right).

As shown in FIGS. 1a-1e, especially 1b-1e, different configurations of beam shaping elements 20 and related light sources 10 are created, especially in the xy-plane, i.e. a plane parallel to the arrangement 100 of the light sources and the arrangement of the beam shaping elements. Hence, would a superposition be made, the different configuration may clearly be seen, see e.g. FIG. 1f, wherein two examples are provided, with in the top a regular arrangement of the beam shaping elements 20, but an irregular or quasi random arrangement of the light sources 10, and in the bottom a regular arrangement 100 of the light sources 10, and an irregular or quasi random arrangement 200 of the beam shaping elements 20, obtained by using beam shaping elements 20 having different second dimensions d2.

FIG. 1f shows in the upper series three different spatial configurations of the light sources 10 that are configured upstream of the respective beam shaping elements 20. FIG. 1 shows in the upper series at least a few different spatial configurations of the light sources 10 that are configured upstream of the respective beam shaping elements 20.

In the following, amongst others simulation results on a slightly irregular LED distribution in combination with a slightly irregular layer of clear PMMA spheres are shown.

If one LED is switched on, the closest sphere will produce a main intensity peak. Neighboring spheres may produce some secondary, lower, intensity peaks. When a large number of microLEDs is used, these peaks will average out to a background level. This background level may be reduced by blocking elements in between the spheres or by using somewhat collimated microLEDs instead of Lambertian emitting sources (for instance, by using microLEDs in small reflector cups or with primary optics).

The light source and its closest sphere are an example of embodiments that are herein amongst others also indicated as a beam shaping element and the light source configured upstream thereof.

It cannot be excluded that some light sources evenly distribute the light over two or more beam shaping elements. This may however be ignored in view of the relatively large number of light sources or alternatively, the light source may be considered to consist of two or more light sources (which are in the same controllable subset).

Figure 2A:
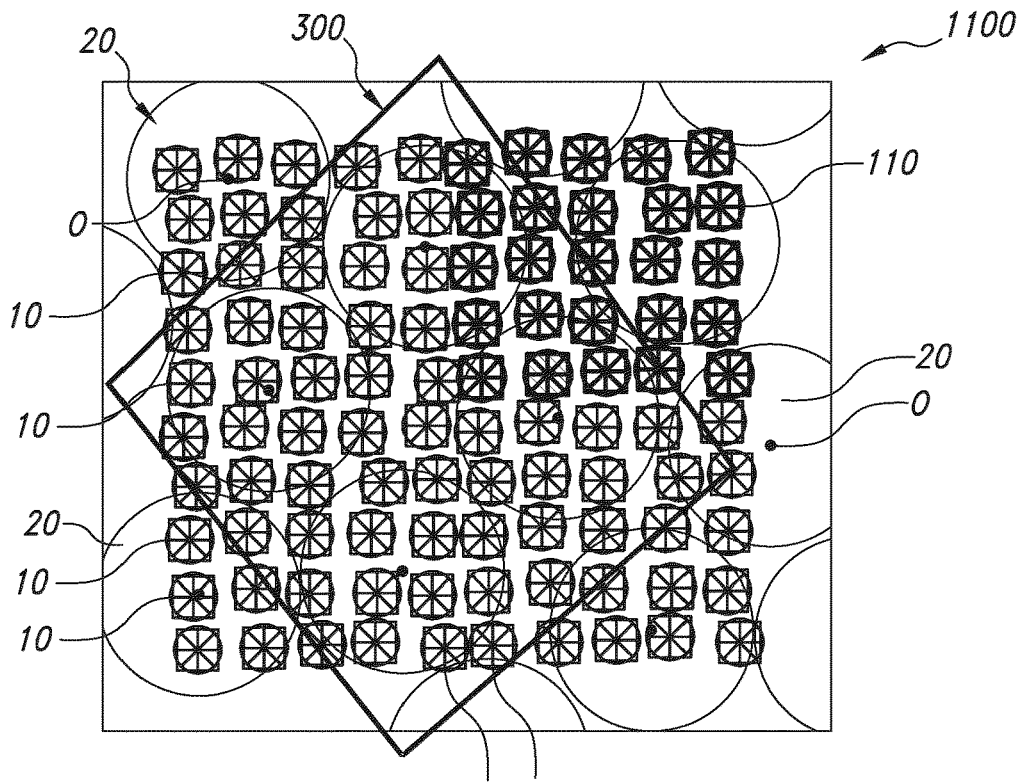
FIGS. 2a-2b schematically depict an embodiment and concomitant simulations.

FIG. 2a schematically depicts an embodiment of a lighting device 1100, or at least part thereof, with a plurality of light sources 10, which are indicated with the small circles, and downstream thereof beam shaping elements 20, indicated with the large circles. They are drawn in a single (projection) plane. Further, by way of example a partition P is shown.

Especially, for each beam shaping element 20 in the partition 300, at least two respective light sources 10, even more especially at least four respective light sources 10, belong to different individually controllable subsets 110. A partition 300 may be a cross-sectional part of the lighting device, which may define a volume of the entire height H of the lighting device, and which may thus include a plurality of beam shaping elements and a plurality of (even more than the number of beam shaping elements) (respective) light sources 10.

As indicated above, the lighting device 1100 comprises p partitions 300 comprising m1 (adjacent) beam shaping elements 20 (here four) and n1 (adjacent) light sources 10, here about 60, configured upstream of the m1 beam shaping elements 20. Wherein at least part of the total number of n1 light sources 10 are comprised by the plurality k of individually controllable subsets 110 of light sources 10. As shown, the configuration of the light sources 10 upstream of each beam shaping element 20 is different from the other. Hence, each of the m1 beam shaping elements 20 and the n1 light sources 10 configured upstream thereof have a configuration relative to each other, wherein irrespective of a distance between second 2D arrangement 200 and the respective light sources 10 (i.e. a distance in the z-direction, perpendicular to the plane of the light sources or the plane of the beam shaping elements) the m1 configurations mutually differ.

Note that for the sake of clarity, in the drawings not all light sources are indicated with their reference 10; likewise, not all subsets are indicated with their reference 110; hence, there may be more subsets than indicated with reference 110 in the drawings. This also applies to other elements, like the beam shaping elements 20, which are not all individually indicated with reference 20.

Figure 2B:
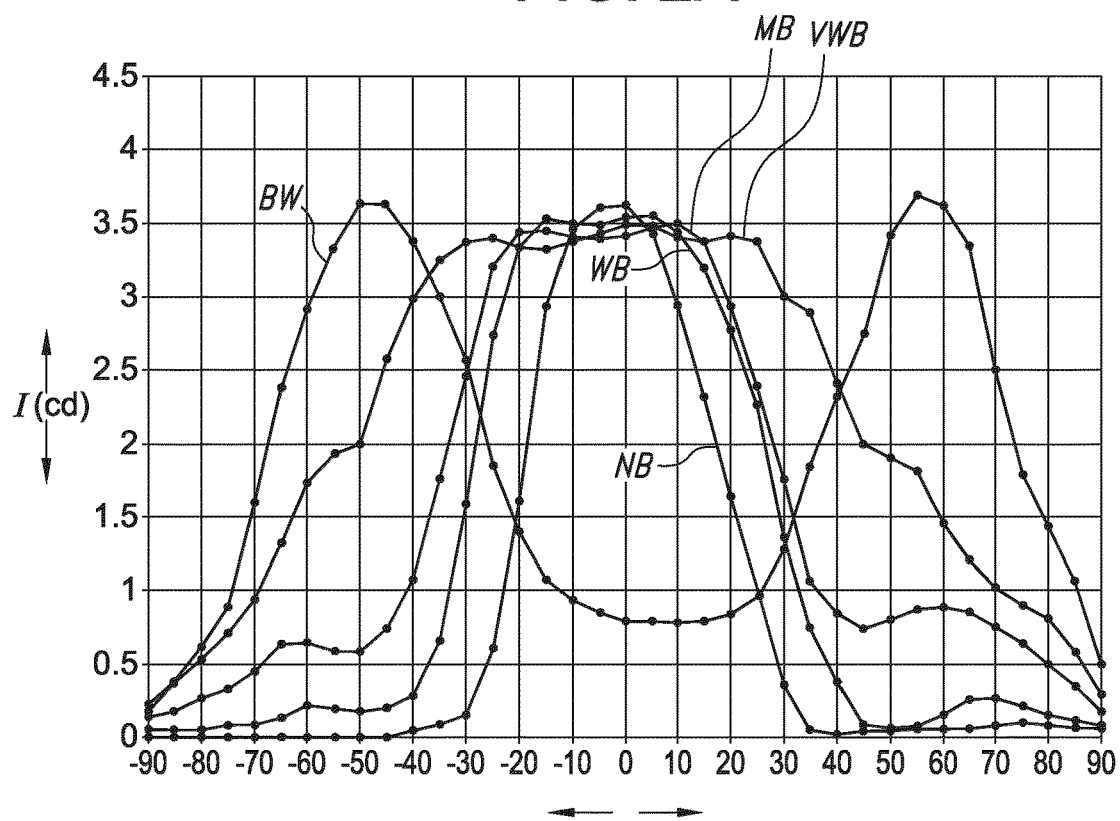
Figure 3A:
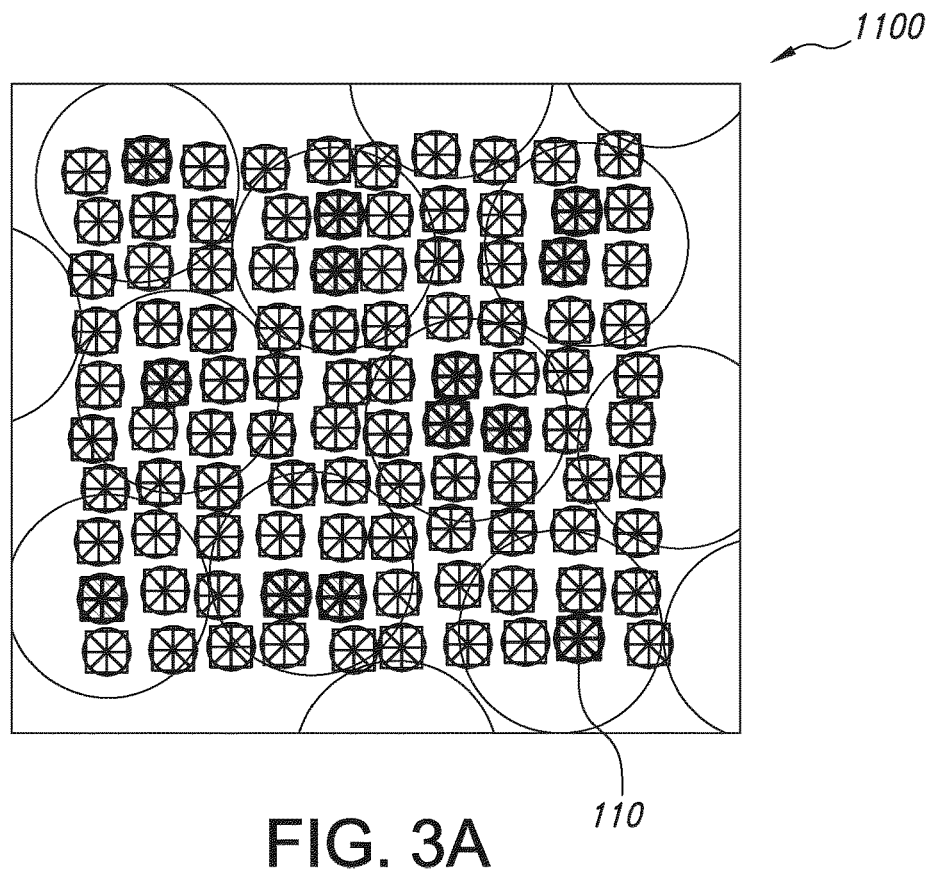
FIGS. 3a-7b depict some arrangements, subsets and beam shapes.
Figure 3B:
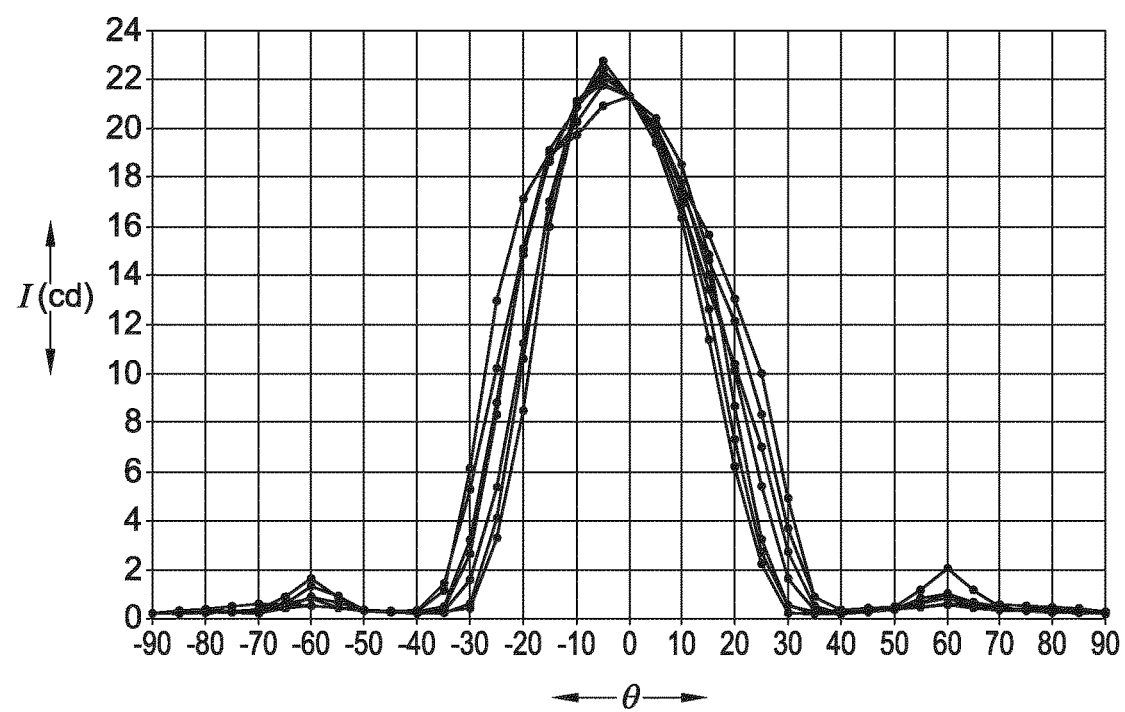
Figure 4A:
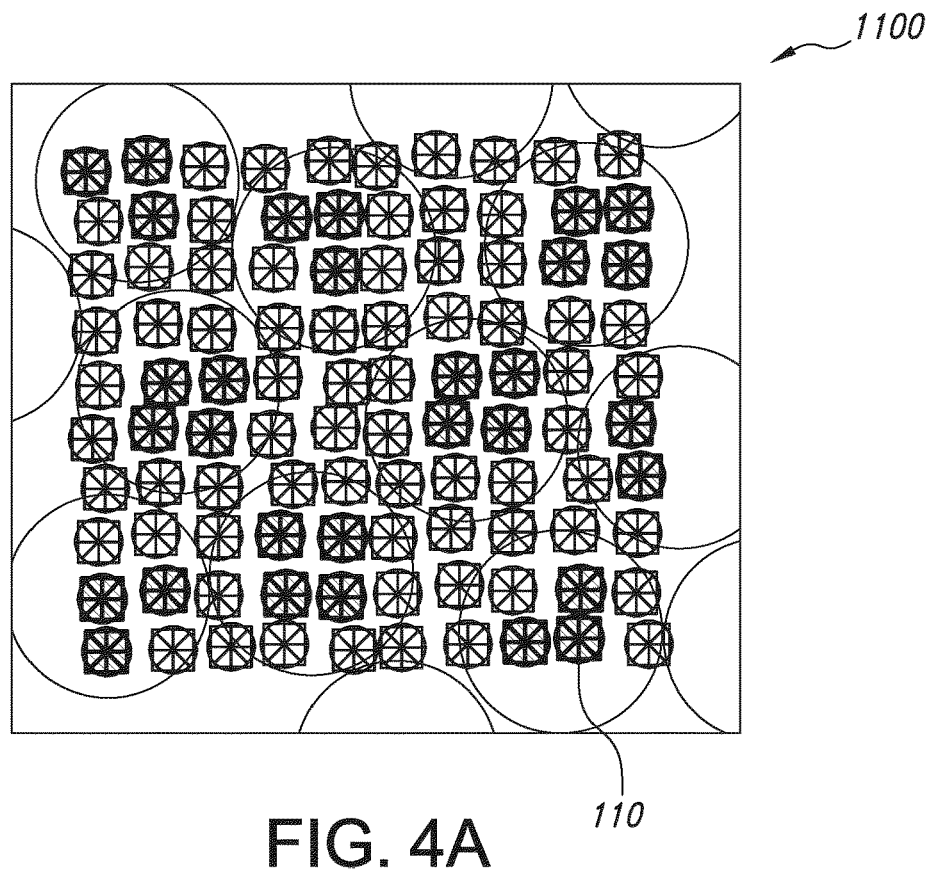
Figure 4B:
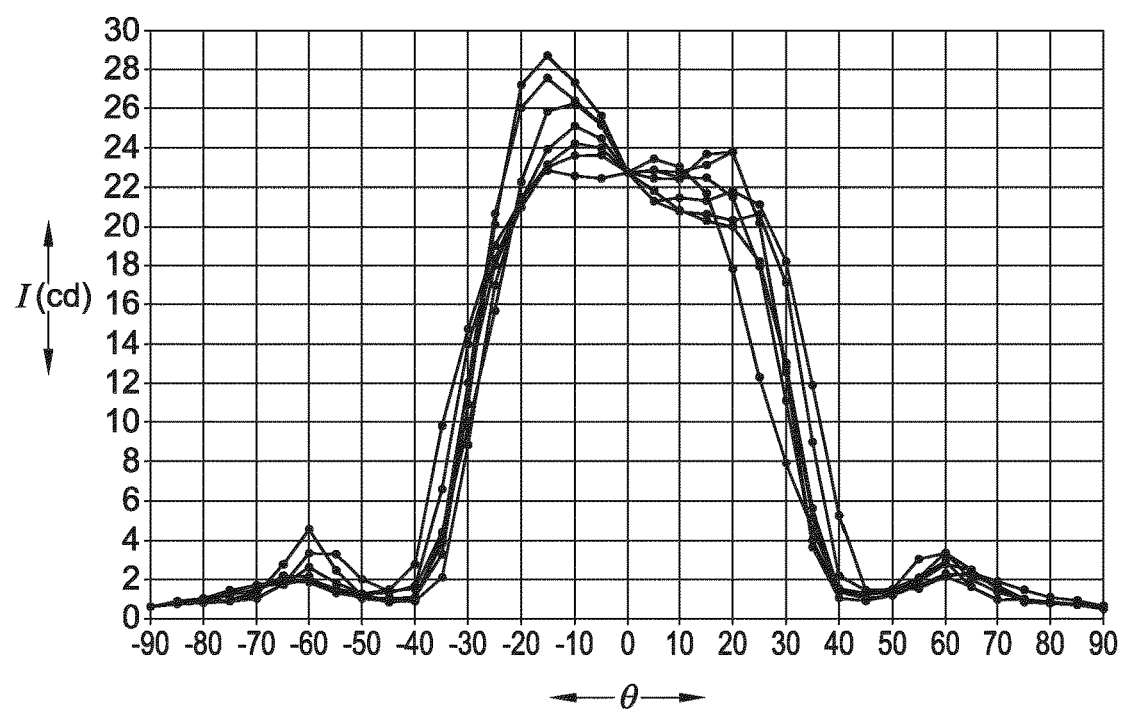
Figure 5A:
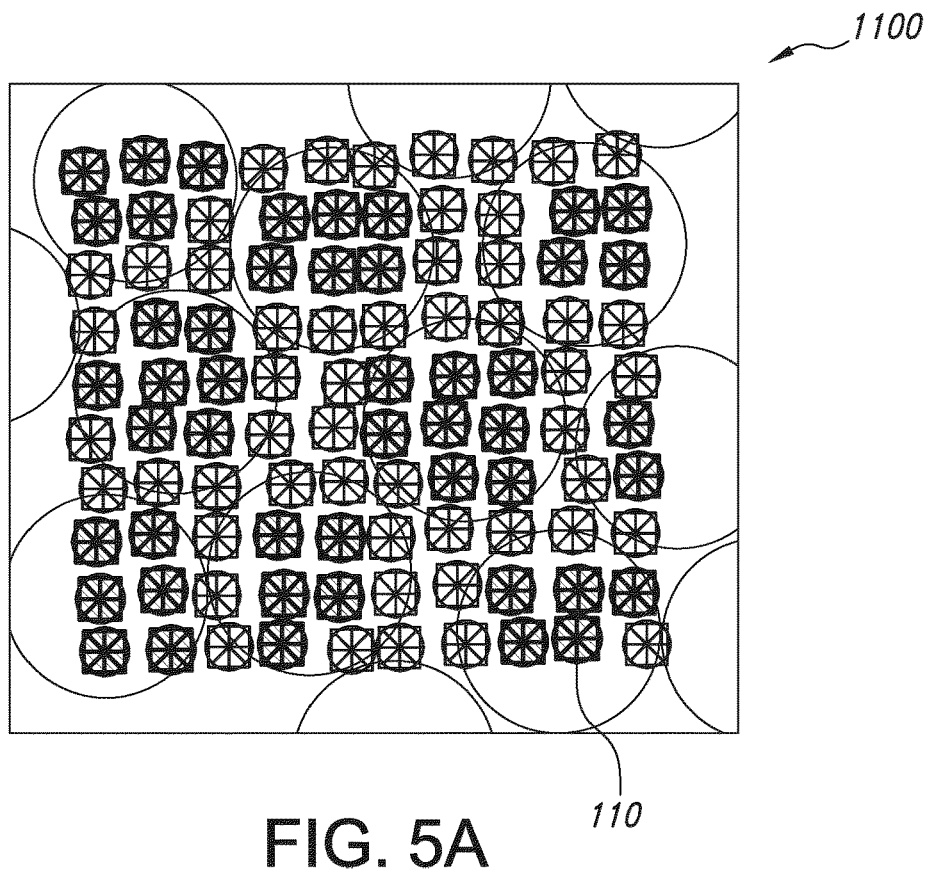
Figure 5B:
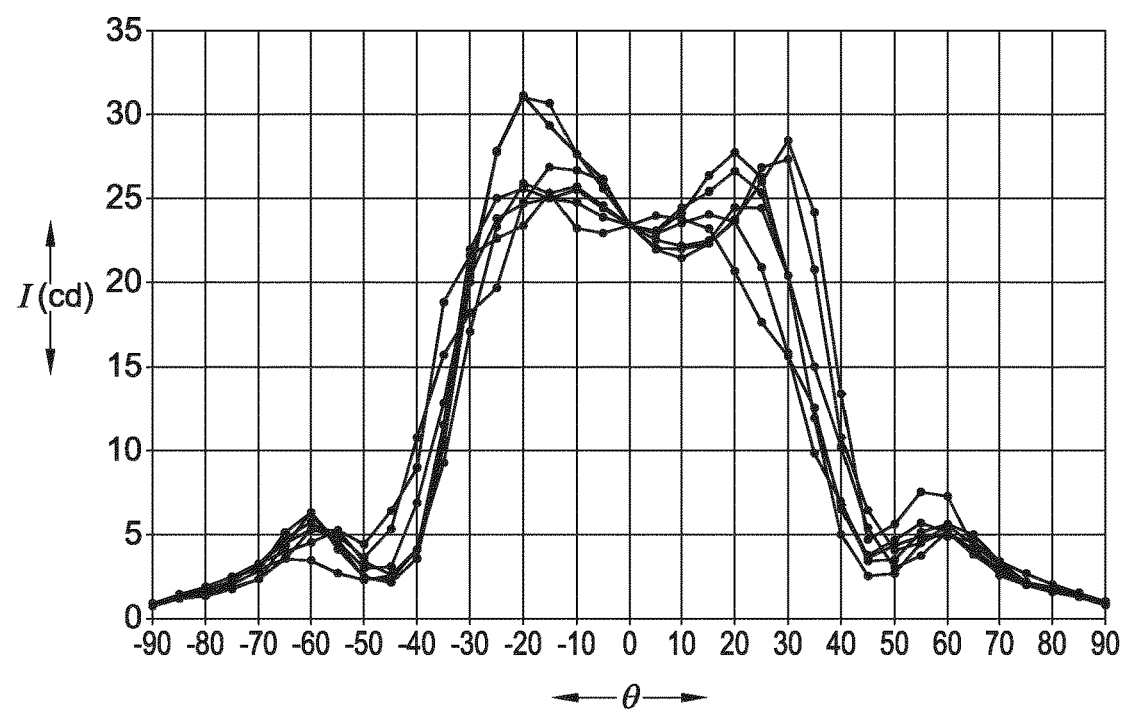
Figure 6A:
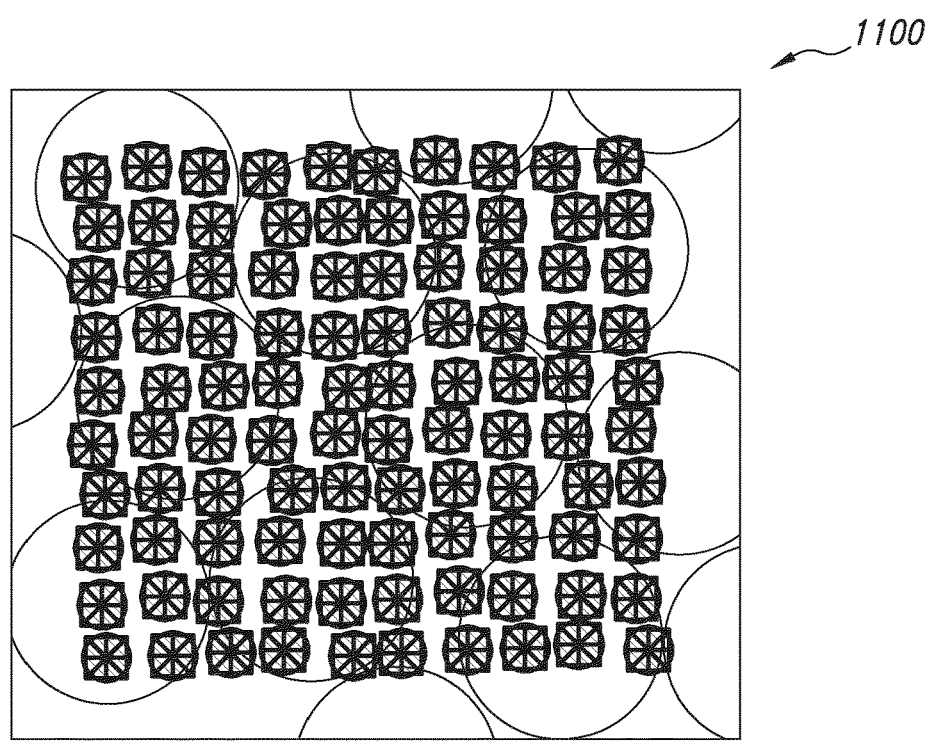
Figure 6B:
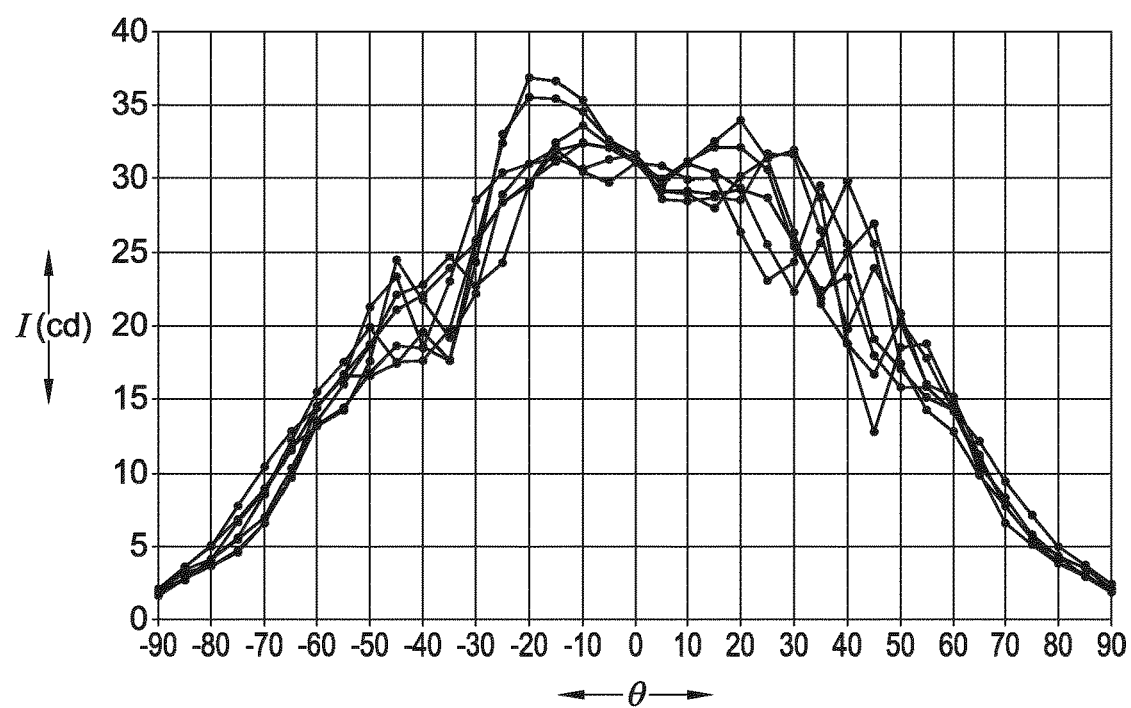
Figure 7A:
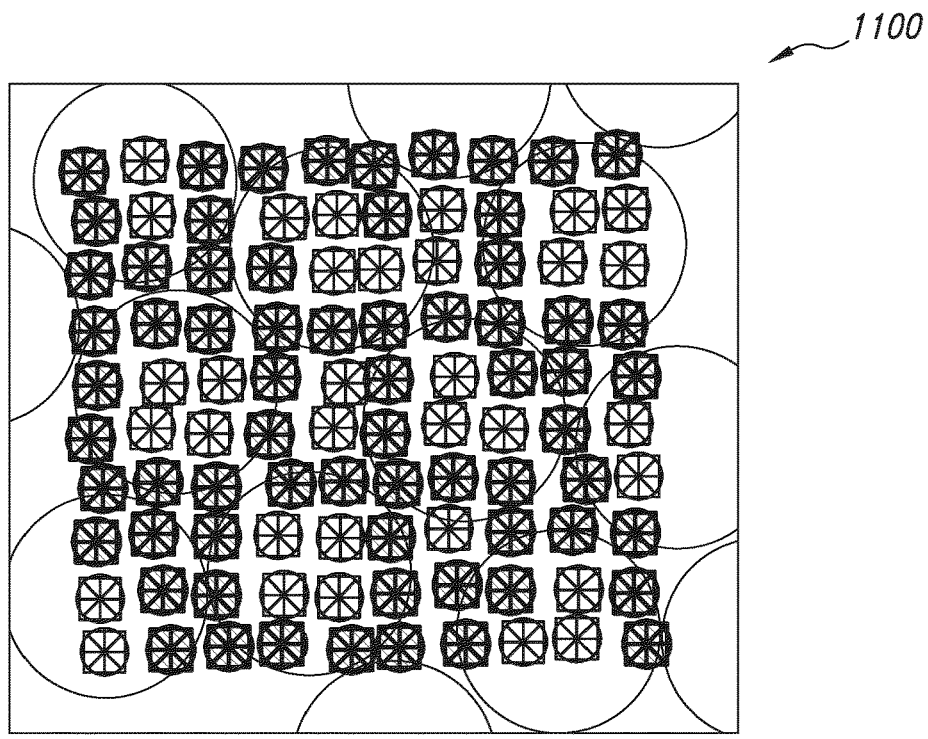
Figure 7B:
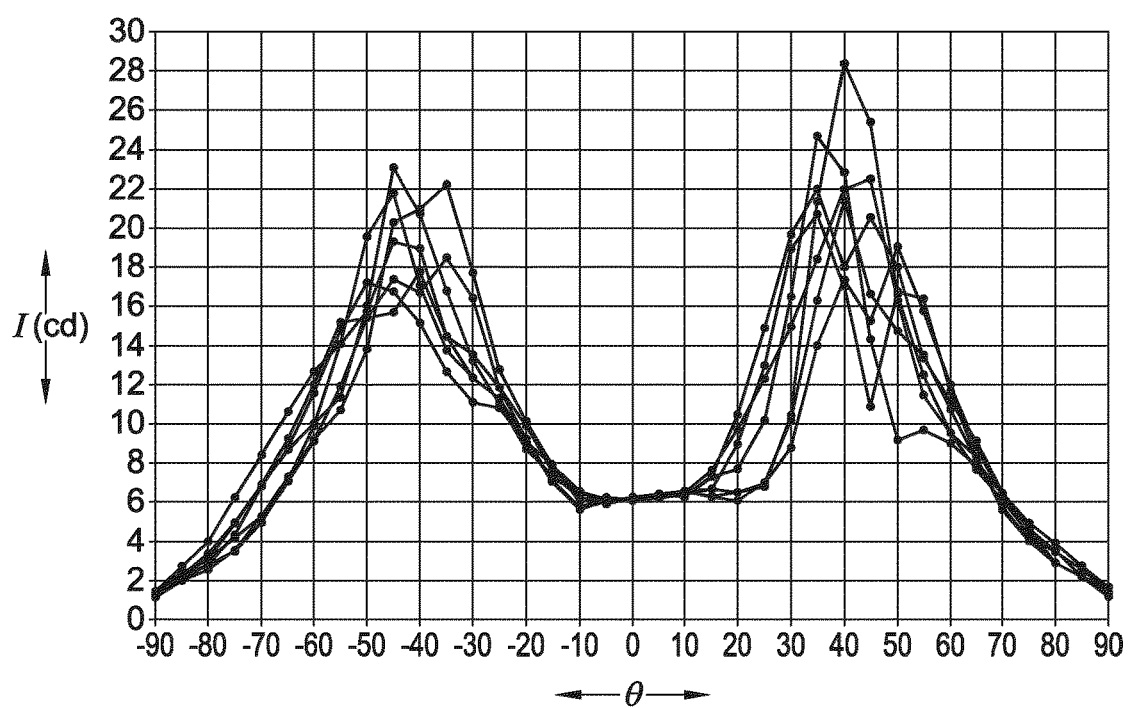

Based on the partition indicated in FIG. 2a, light beams where simulated in a Monte Carlo ray tracing simulation software tool. They are schematically depicted in FIG. 2b. It appears that by controlling the light sources, here switching on or of different light source within the partition, very different beam shapes of the lighting device light can be obtained, such as narrow beams (NB), medium broad beams (MB), wide beams (WB), very wide beams (VWB), asymmetric beams (not depicted), batwing or hollow beams (BW), etc.

FIG. 2b is based on FIGS. 3a-7b, wherein different subsets of light sources are switched on (bold drawn light sources) or off (non-bold). As is shown, completely different beam shapes can be provided. Each of FIGS. 3, 4, 5, 6, and 7 show different subsets (a figures) and related beam shapes (b figures). The different curves in the b figures refer to different slices of the beam.

As indicated above, also an asymmetric beam may be created.

Hence, amongst others it is herein proposed to add a layer of clear refractive spheres to aim the light of individual LEDs, especially microLEDs. This may be in a structured pattern of spheres and light sources, such as microLEDs, but especially also with (semi)unstructured light sources and/or sphere distributions. In an aspect, a calibration step may be applied to identify the intensity distribution of each light source or subset of light sources (such as microLEDs). This may be a detailed luminous intensity distribution, or simply the coordinates and relative intensity of the main beam direction. Any overall intensity pattern can then be generated by switching on a subset of the light sources, such as microLEDs. This subset (or individual dimming levels) may in embodiments be determined by an optimization algorithm to match the ensemble of light sources, such as microLEDs, intensity distributions to the target distribution. It may in embodiments also simply be switching on all light sources with a peak intensity direction within a given angular distance to the target peak intensity direction.

Figure 8:
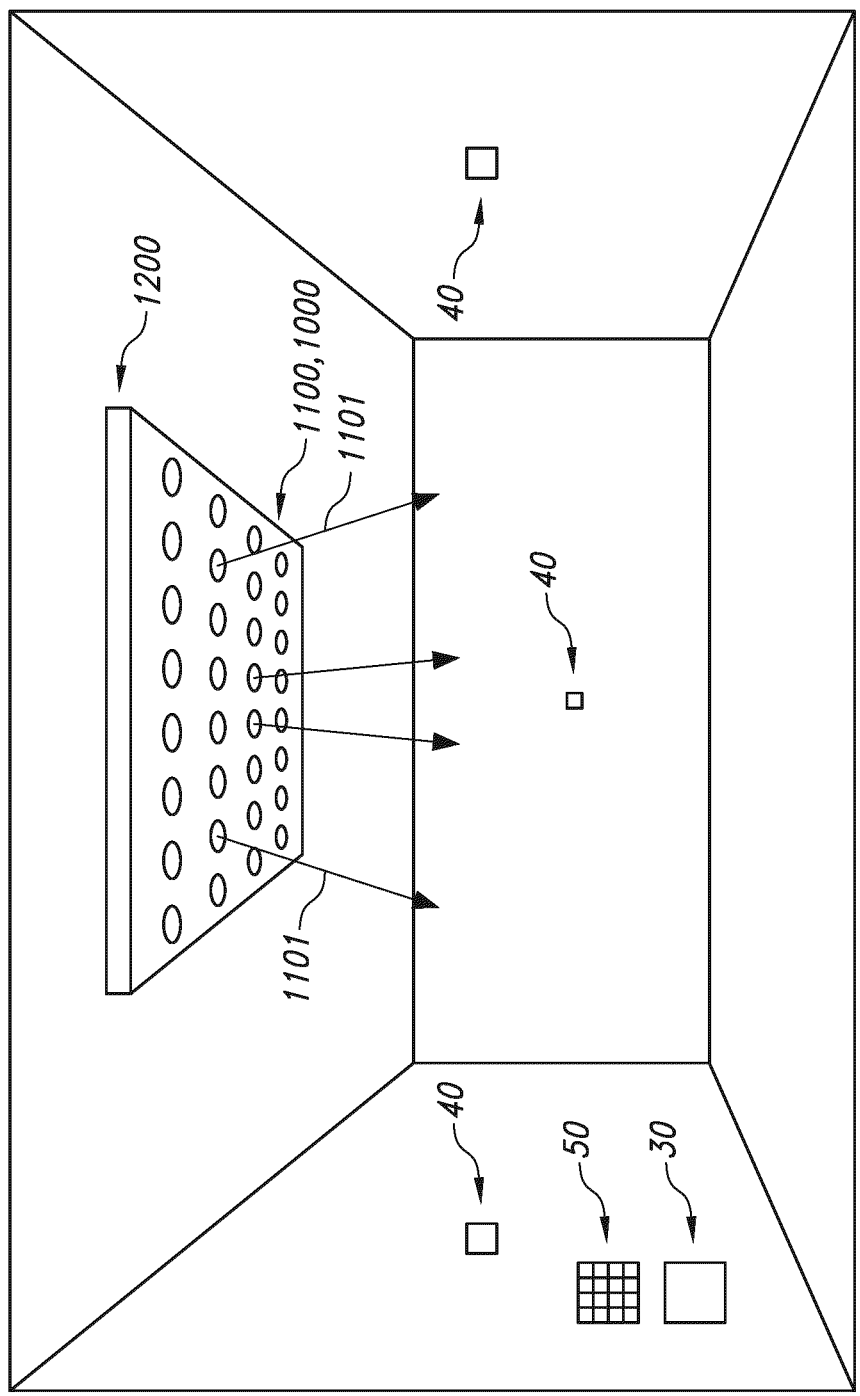
FIG. 8 schematically depicts amongst others an embodiment of a lighting system.

FIG. 8 schematically depicts an embodiment of a luminaire 1200 comprising the lighting device 1100. Further, Fig. also schematically depicts an embodiment of a lighting system 1000 comprising the lighting device 1100. The lighting system 1000 may further comprise and a control system 30, configured to control the plurality k of individually controllable subsets of light sources. The control system 30 may be configured to control the beam shape and/or beam direction of the lighting device light. Further, optionally the control system 30 may be configured to control the spectral distribution of the lighting device light 1101.

The lighting system 1000 may in embodiments further comprise one or more optical sensors 40 external of the lighting device 1100 and functionally coupled to the control system 30. In specific embodiments, the one or more optical sensors 40 may be configured to generate a calibration sensor signal during a calibrate routine. As indicated above, in embodiments the control system 30 may be configured to execute in a calibration mode a calibrate routine wherein the calibration routine determines as function of (i) the plurality k of individually controllable subsets 110 of light sources 10 and (ii) one or more of user input information and a calibration sensor signal a set of (a) intensity distribution characteristics and (b) related light source settings of the plurality k of individually controllable subsets 110 of light sources 10.

Yet further, the lighting system 1000 may comprise a user interface 50, wherein the user interface 50 is functionally connected or connectable to the control system 30. Connection may be wireless or wired.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising a first 2D arrangement of a plurality n of light sources and a second 2D arrangement of a plurality m of beam shaping elements configured downstream of the light sources, wherein:
    the light sources are configured to generate light source light, wherein the n light sources comprises a plurality k of individually controllable subsets of light sources, wherein the beam shaping elements are configured to shape a beam of the light source light of then light sources, and wherein n≥16, m≥4, n/m>1, and k≤n/2;
    upstream of each beam shaping element light sources are configured of different individually controllable subsets, and wherein two or more of the beam shaping elements have different spatial configurations relative to the light sources that are configured upstream of the respective beam shaping elements;
    wherein the light sources comprise solid state light sources having first dimensions d1 selected from the group of a first length, a first width, a first diagonal length, and a first diameter, wherein the beam shaping elements comprise light transmissive elements having second dimensions d2 selected from the group of a second length, a second width, a second diagonal length, and a second diameter, wherein d2≥4*d1, and wherein the beam shaping elements comprise spheres.

2. The lighting device according to claim 1, wherein:
    the lighting device comprises p partitions comprising (i) m1 beam shaping elements and (ii) n1 light sources configured upstream of the m1 beam shaping elements, wherein at least part of the total number of n1 light sources are comprised by the plurality k of individually controllable subsets of light sources, wherein each of the m1 beam shaping elements (20) and the n1 light sources configured upstream thereof have a configuration relative to each other, wherein 1≤p≤m, 4≤m1≤m, and 16≤n1≤n, and wherein irrespective of a distance between second 2D arrangement and the respective light sources the m1 configurations mutually differ.

3. The lighting device according to claim 2, wherein (i) the n1 light sources are comprised by a first arrangement of at least part of the total number of n light sources, wherein the first arrangement is random or quasi random, and/or (ii) wherein the m1 beam shaping elements are comprised by a second arrangement of at least part of the total number of m beam shaping elements, wherein the second arrangement is random or quasi random.

4. The lighting device according to claim 1, comprising a plurality of spacers, wherein the spacers define the position of at least part of the total number of m beam shaping elements, wherein the spacers are comprised by a third arrangement, wherein the third arrangement is random or quasi random.

5. The lighting device according to claim 1, wherein the light sources have a first pitch (x1) and the beam shaping elements have a second pitch (x2), wherein the first pitch (x1) is smaller than the second pitch (x2), and wherein a ratio of the second pitch (x2) to the first pitch (x1) defined as a*x2/x1 is not an integer, wherein a is an integer selected from the range of 1-10.

6. The lighting device according to claim 1, wherein the light sources comprise solid state light sources, wherein the beam shaping elements, wherein the second 2D arrangement of beam shaping elements is random or quasi random.

7. The lighting device according to claim 1, wherein k≤n/4.

8. The lighting device according to claim 7, wherein the first dimensions d1 are at maximum 200 μm, and wherein the second dimensions d2 are at least 800 μm, wherein the dimensions d2 are second diameters.

9. The lighting device according to claim 7, wherein the wherein the beam shaping elements comprise a plurality p2 of subsets of beam shaping elements wherein the subsets mutually differ with respect to at least one of the second dimensions d2, wherein p2≥2.

10. The lighting device according to claim 1, wherein the spheres have two or more different dimensions.

11. The lighting device according to claim 1, wherein the lighting device comprises a monolayer of the beam shaping elements, and wherein n≥100, n/m≥4, k≥10, and p≥10.

12. A luminaire comprising:
    a lighting device having a first 2D arrangement of a plurality n of light sources and a second 2D arrangement of a plurality m of beam shaping elements configured downstream of the light sources, wherein,
    the light sources are configured to generate light source light, wherein the n light sources comprises a plurality k of individually controllable subsets of light sources, wherein the beam shaping elements are configured to shape a beam of the light source light of the n light sources, and wherein n≥16, m≥4, n/m>1, and k≤n/2;

upstream of each beam shaping element light sources are configured of different individually controllable subsets, and wherein two or more of the beam shaping elements have different spatial configurations relative to the light sources that are configured upstream of the respective beam shaping elements;

wherein the light sources comprise solid state light sources having first dimensions d1 selected from the group of a first length, a first width, a first diagonal length, and a first diameter, wherein the beam shaping elements comprise light transmissive elements having second dimensions d2 selected from the group of a second length, a second width, a second diagonal length, and a second diameter, wherein d2≥4*d1, and wherein the beam shaping elements comprise spheres.

13. A lighting system comprising:

a lighting device having a first 2D arrangement of a plurality n of light sources and a second 2D arrangement of a plurality m of beam shaping elements configured downstream of the light sources, wherein the light sources are configured to generate light source light, wherein the n light sources comprises a plurality k of individually controllable subsets of light sources, wherein the beam shaping elements are configured to shape a beam of the light source light of the n light sources, and wherein n≥16, m≥4, n/m>1, and k≤n/2;

upstream of each beam shaping element light sources are configured of different individually controllable subsets, and wherein two or more of the beam shaping elements have different spatial configurations relative to the light sources that are configured upstream of the respective beam shaping elements;

wherein the light sources comprise solid state light sources having first dimensions d1 selected from the group of a first length, a first width, a first diagonal length, and a first diameter, wherein the beam shaping elements comprise light transmissive elements having second dimensions d2 selected from the group of a second length, a second width, a second diagonal length, and a second diameter, wherein d2≥4*d1, wherein the beam shaping elements comprise spheres, and a control system, configured to control the plurality k of individually controllable subsets of light sources.

14. The lighting system according to claim 13, wherein the control system is configured to execute in a calibration mode a calibration routine wherein the calibration routine determines as function of (i) the plurality k of individually controllable subsets of light sources and (ii) one or more of user input information and a calibration sensor signal, a set of (a) intensity distribution characteristics and (b) related light source settings of the plurality k of individually controllable subsets of light sources.

15. The lighting system according to claim 14, further comprising one or more optical sensors external of the lighting device and functionally coupled to the control system, wherein the one or more optical sensors are configured to generate the calibration sensor signal during the calibrate routine.

* * * * *